(12) United States Patent
Ravishankar et al.

(10) Patent No.: US 10,278,133 B2
(45) Date of Patent: Apr. 30, 2019

(54) METHODS FOR UPLINK POWER CONTROL TO COMBAT RAIN FADE IN WIDEBAND SATELLITE SYSTEMS

(71) Applicant: HUGHES NETWORK SYSTEMS, LLC, Germantown, MD (US)

(72) Inventors: Channasandra S. Ravishankar, Germantown, MD (US); Mu Li, Germantown, MD (US); John Corrigan, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/833,112

(22) Filed: Dec. 6, 2017

(65) Prior Publication Data

US 2018/0160373 A1 Jun. 7, 2018

Related U.S. Application Data

(60) Provisional application No. 62/430,904, filed on Dec. 6, 2016.

(51) Int. Cl.
| | |
|---|---|
| *H04B 1/60* | (2006.01) |
| *H04W 52/14* | (2009.01) |
| *H04W 52/24* | (2009.01) |
| *H04B 7/185* | (2006.01) |
| *H04W 84/06* | (2009.01) |
| *H04W 52/34* | (2009.01) |

(52) U.S. Cl.
CPC ...... *H04W 52/143* (2013.01); *H04B 7/18543* (2013.01); *H04W 52/242* (2013.01); *H04W 52/146* (2013.01); *H04W 52/243* (2013.01); *H04W 52/245* (2013.01); *H04W 52/346* (2013.01); *H04W 84/06* (2013.01)

(58) Field of Classification Search
CPC .......................... H04W 52/10; H04W 52/146
USPC .................... 455/427, 430, 13.4, 504, 10
See application file for complete search history.

(56) References Cited

U.S. PATENT DOCUMENTS

| | | | | |
|---|---|---|---|---|
| 5,924,015 | A * | 7/1999 | Garrison | H04B 7/18543 455/13.4 |
| 7,107,007 | B1 * | 9/2006 | Lee | G01S 19/00 342/355 |

* cited by examiner

*Primary Examiner* — Tu X Nguyen
(74) *Attorney, Agent, or Firm* — Jones Robb, PLLC

(57) ABSTRACT

A system and method for controlling uplink power to combat rain fade in satellite communication systems. First communication signals transmitted from a satellite to a satellite operations center are monitored at a gateway. A downlink attenuation level is determined for the first communication signals, and compared to an ideal attenuation level. if the downlink attenuation level exceeds the ideal attenuation level, then a corresponding uplink attenuation level is determined for a second frequency used to transmit second communication signals to the satellite, and converted to a power control command for adjusting an amplifier gain. The second communication signals are transmitted to the satellite at either a compensated power level or a normal power level, depending on whether the downlink attenuation level exceeds the ideal attenuation level.

30 Claims, 18 Drawing Sheets

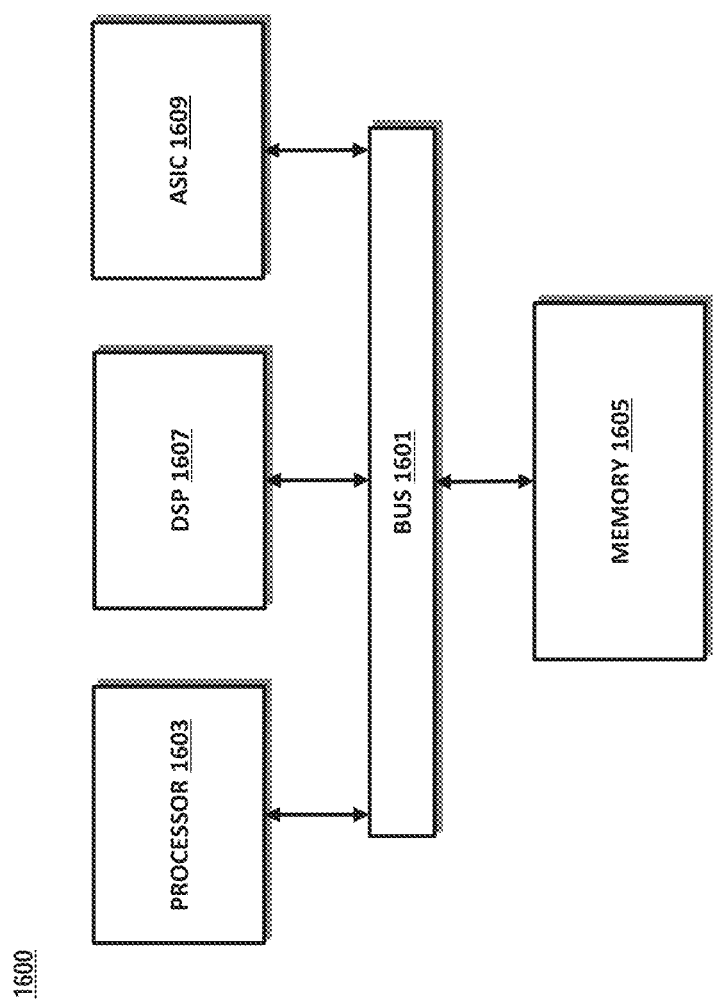

METHODS FOR UPLINK POWER CONTROL TO COMBAT RAIN FADE IN WIDEBAND SATELLITE SYSTEMS

CROSS-REFERENCE TO RELATED APPLICATION

The present application claims priority to U.S. Provisional Patent Application No. 62/430,904 filed Dec. 6, 2016, the entire disclosure of which is incorporated herein by reference.

BACKGROUND INFORMATION

Geo-Synchronous Orbit (GSO) wideband satellite communications has experienced significant growth over the last several years, providing sizable increases in coverage and connectivity across the globe. One of the key enabling technology for satellite communication is spectrum sharing between broadband GSO and NGSO systems by imposing strictly interference control between the emerging NGSO and existing GSO systems to ensure their co-existence. It is well-known that the primary challenge to higher frequency Ka-band communication satellite system is the high rain fades. One of effective methods to mitigate the rain fade is applying power control techniques where transmit power is dynamically adjusted based on the rain fade estimation. For the approach to effectively mitigate rain fade while meeting interference criteria as set by ITU, accurate estimation of rain fade is critical. Furthermore, when adjusting the transmit power it is prudent to avoid unnecessary power increase in order to minimize potential interference to other systems.

Existing wireless networks mostly utilize Received Signal Strength Indicator (RSSI) power measurement to estimate downlink (satellite to ground) rain fade. The method utilizes a constant wave (CW) signal chain that is transmitted from the satellite at a known power level. The CW signal is monitored and compared to an expected level corresponding to no rain fade. If the CW signal is lower than expected, rain fade is concluded to be the cause of any attenuation. Such method can also require the CW signal to have precise gain which is susceptible to temperature variation especially if radio equipment is located in outdoor environment. In addition, the accuracy of the approach could be adversely affected by the interference signal, resulting in measurement error. The power control schemes are not optimized from end-to-end performance perspective, hence often transmit higher power (hence more interference) without overall performance benefit in return. Based on the foregoing, there is a need for an approach that improves rain fade estimation to facilitate more accurate transmit power adjustments.

BRIEF SUMMARY

A method and system for uplink power control are described. According to an embodiment, the method includes: monitoring first communication signals transmitted at a first frequency from a satellite to a satellite operations center, at a gateway of a satellite communication system; determining a downlink attenuation level of the first communication signals, the downlink attenuation resulting, at least in part, from atmospheric conditions; comparing the downlink attenuation level to an ideal attenuation level; if the downlink attenuation level exceeds the ideal attenuation level, then performing an uplink compensation by: determining a corresponding uplink attenuation level for a second frequency used to transmit second communication signals containing user traffic to the satellite, setting a target uplink power level for reducing and/or cancelling the uplink attenuation level, and converting the uplink power attenuation level to a power control command for adjusting an amplifier gain, the power control command being based on the target uplink power level, transmitting the second communication signals to the satellite at a compensated power level, if the downlink attenuation level exceeds the ideal attenuation level; and transmitting the second communication signals to the satellite at the normal power level, if the downlink attenuation level does not exceed the ideal attenuation level.

According to another embodiment, the system includes: a satellite; and a gateway for communicating with the satellite and one or more external networks. The gateway includes: at least one processor for controlling various operations of the gateway; a transceiver unit for transmitting/receiving signals to/from a satellite; a telemetry receiver for monitoring first communication signals transmitted from the satellite at a first frequency; and a rain fade estimation unit configured to: determine a downlink attenuation level of the first communication signals, the downlink attenuation resulting, at least in part, from atmospheric conditions, determine if the downlink attenuation level exceeds an ideal attenuation level, determine a corresponding uplink attenuation level for a second frequency used to transmit second communication signals containing user traffic to the satellite, set a target uplink power level for reducing and/or cancelling the uplink attenuation level, and convert the uplink attenuation level to a power control command for adjusting an amplifier gain, the power control command being based on the target uplink power level, wherein the gateway transmits the second communication signals to the satellite at a compensated power level, and wherein the gateway transmits the second communication signals to the satellite at a normal power level if the downlink attenuation level does not exceed the ideal attenuation level.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 16 is a diagram of a chip set that can be used to implement various exemplary embodiments.

DETAILED DESCRIPTION

A method and system for uplink power control are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
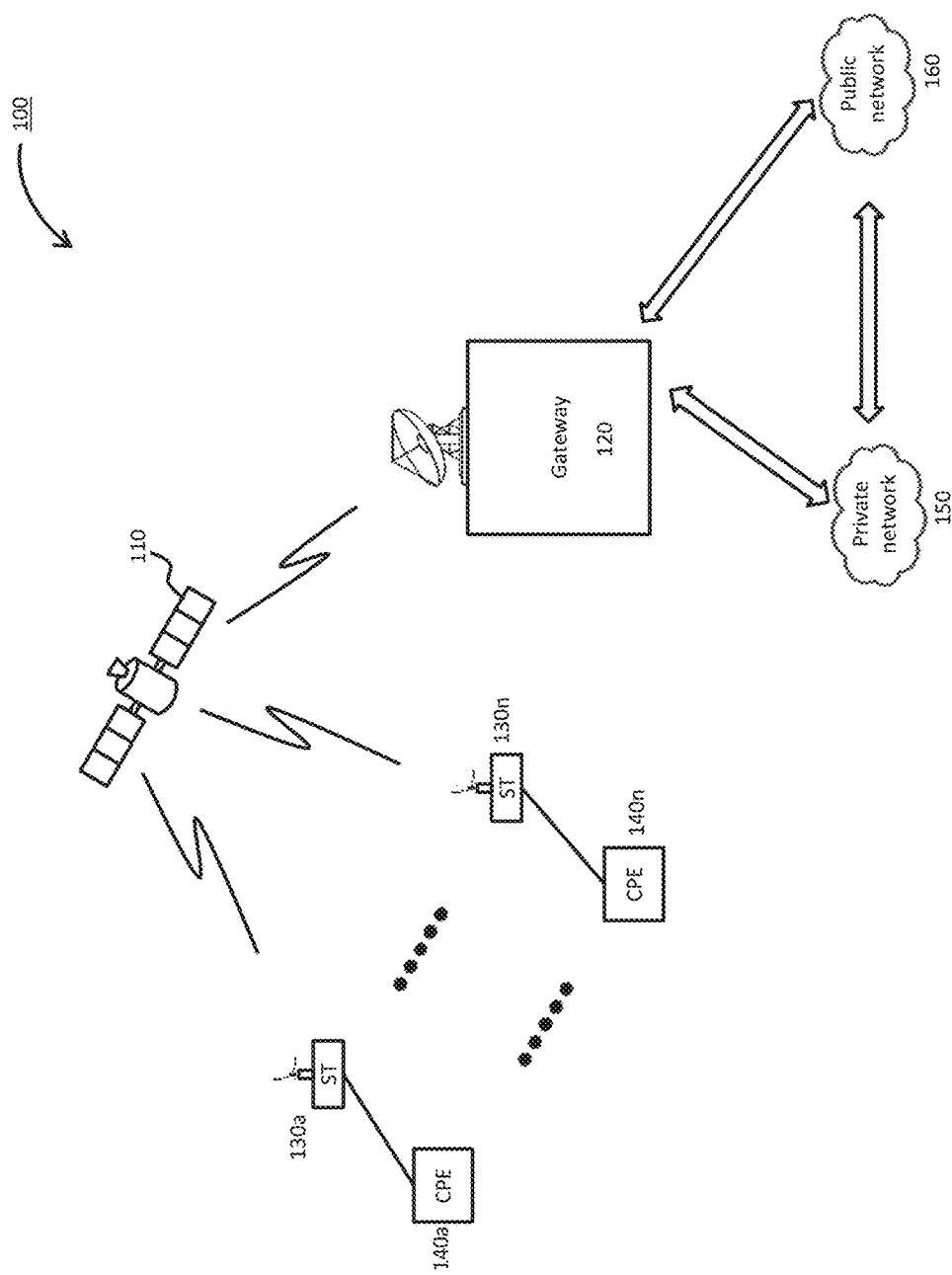
FIG. 1 is a diagram of a conventional satellite communication system capable of providing voice and data services.

FIG. 1 illustrates an exemplary satellite communication system 100 capable of providing voice and data services. The communication system 100 includes a satellite 110 that supports communications among a number of gateways 120 (only one shown) and multiple satellite terminals (STs) 130a-130n. As used herein, the term satellite terminal corresponds to various types of terminals that are used to communicate directly with the satellite. For example, the satellite terminal can be fixed (small, medium, or large) or mobile (e.g., mobile handset). The small fixed satellite terminals are often configured as very small aperture terminals, or VSAT. The terms user terminal, satellite terminal, terminal are used interchangeably to identify any of the foregoing types.

Each satellite terminal 130 can be configured for relaying traffic between its customer premise equipment (CPEs) 140a-140n, its private network 150, and/or a public network 160 such as the internet. The gateway 120 can be configured to route this traffic across the private network 150 and public network 160 as appropriate. The gateway 120 can be further configured to route traffic from the private network 150 and public network 160 (internet) across the satellite link to the appropriate terminal 130. The terminal 130 then routes the traffic to the appropriate customer premise equipment (CPE) 140.

As illustrated in FIG. 1, the satellite communication system 100 facilitates communication between a satellite network, private communication networks 150, and public communication networks 160. Various embodiments, however, can also be configured for providing communication within only a terrestrial network (e.g., private communication networks 150 and public communication networks 160), or within only a satellite network. Thus, while FIG. 1 illustrates components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
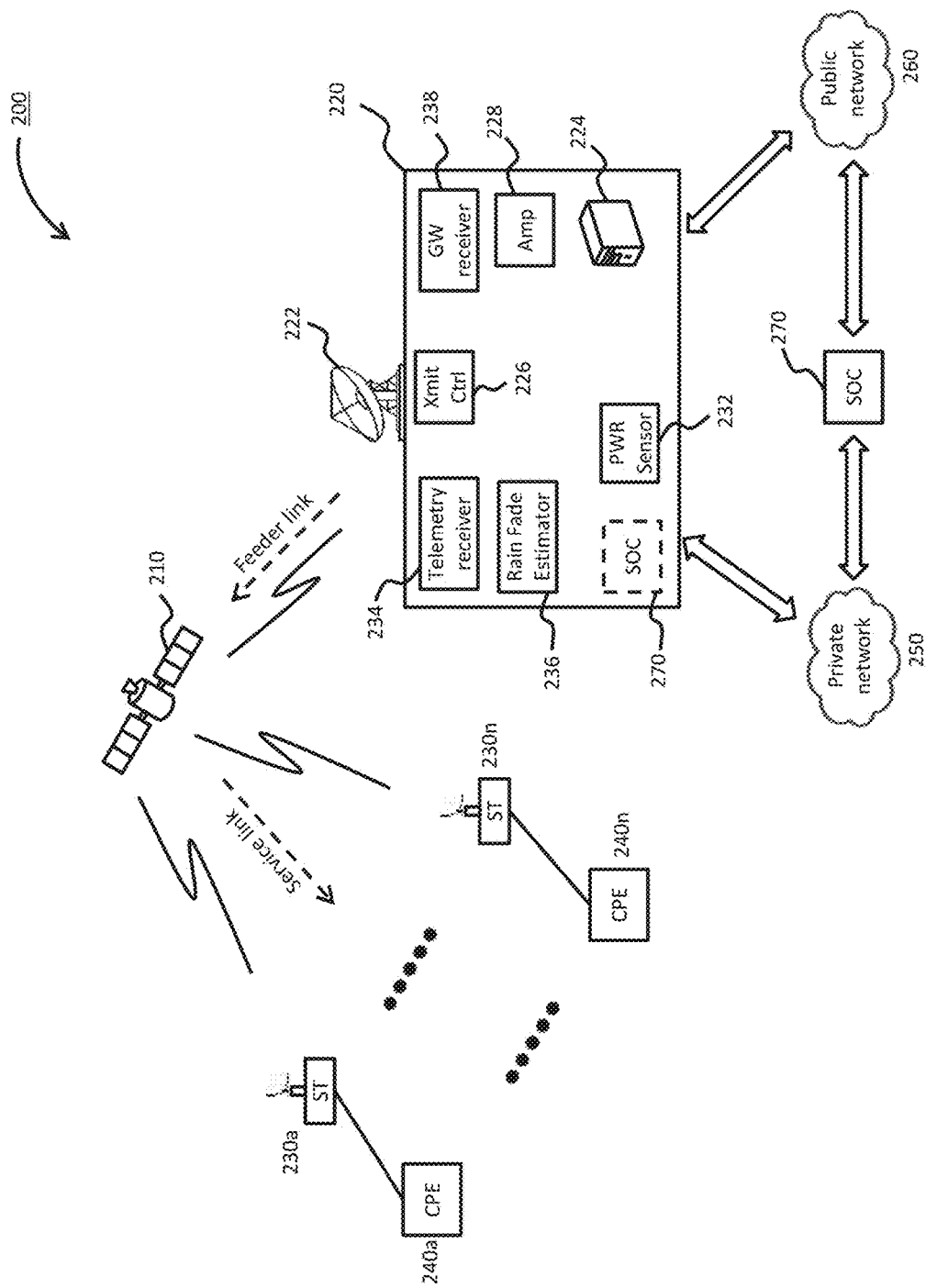
FIG. 2 is a diagram of a system capable of uplink power control to combat rain fade, according to one or more embodiments.

FIG. 2 is a diagram of a system capable of uplink power control to combat rain fade, according to one or more embodiments. According to the illustrated embodiment, the gateway 220 can include various components that facilitate communication with the satellite 210, as well as various external networks. For example, the gateway 220 includes an antenna such as a radio frequency transmitter 222 which transmits and receives various signals to and from the satellite 210. The gateway 220 can also include one or more processing units (or simply CPUs) 224 capable of being configured to control various operations within the gateway 220. The CPU 224 may also be configured to perform some or all task of other components in the gateway 220.

According to at least one embodiment, a transmit controller 226 can be used to control various operations of the gateway 220 related to transmission of signals via the transmitter 222. For example, the transmit controller 226 can control arrangement of data and individual transmit frames that are transmitted to the satellite 210. The transmit controller 226 can further control the timing of specific beam and/or carrier transmissions to the satellite 210. According to one or more embodiments, the CPU 224 can be specifically configured, or programmed, to perform some or all of the functions of the transmit controller 226. The gateway 220 also includes an amplifier 228 that is used to increase the strength (or gain) of signals being transmitted to the satellite 210. According to one or more embodiments, at least one power sensor 232 can be incorporated in the gateway 220 to measure the actual level of power at which communication signals are being transmitted from the gateway 220 and/or to measure the power level of signals that have been amplified by the power amplifier 228.

During normal operations, the satellite 210 exchanges various communication signals with a satellite operations center (SOC) 270. These communication signals are commonly referred to as telemetry tracking and control signals (TT&C or simply telemetry signals). The telemetry signals are utilized by the satellite operations center (SOC) 270 for controlling various aspects of the satellite 210, such as operational state of the various onboard components, orbit tracking, etc. If an adjustment is required to the orbit of the satellite 210, for example, the satellite operations center 270 can transmit information and parameters necessary for making the orbital adjustment within the telemetry signals. The satellite 210 would also transmit information back to the satellite operations center 270 to acknowledge that commands incorporated in the telemetry signals have been received and/or execute. The telemetry signals are transmitted at regular intervals irrespective of commands being received from the satellite operations center. Thus, if there are no acknowledgements or responses, dummy data is carried in the telemetry signal. The sensitive nature of information contained in the telemetry signals being communicated, therefore, requires that they be securely encrypted so that the actual message contents are only accessible by the satellite 210 and the satellite operations center 270.

According to at least one embodiment, the gateway 220 can include a telemetry receiver 234 capable of monitoring the telemetry signals from the satellite 210, without actually decrypting their contents. Thus, the telemetry receiver 236 is only capable of detecting properties or quality metrics of the telemetry signals. Depending on the specific implementation, the CPU 224 can be configured to perform some, or all, of the functions of the telemetry receiver 234. A rain fade estimator 236 can also be incorporated within the gateway 220. The rain fade estimator 236 can be configured to analyze various properties of the telemetry signal to determine, for example, system noise temperature, antenna noise temperature, transmission line temperature. The rain fade estimator 236 can also be configured to detect whether communication signals between the satellite 210 and the gateway 220 are being adversely affected by atmospheric conditions such as rain. The rain fade estimator 236 can further be configured to detect the presence of noise in the communication signal, and predict the amount of amplification required for communication signals being transmitted to the satellite 210. According to various implementations, the amplified communication signal is considered a compensated communication signal capable of compensating for (i.e., reduce or eliminate) any signal fade or signal degradation resulting from the rain.

According to the illustrated embodiment, the gateway 220 is also configured to communicate with various external networks such as a private network 250 or a public network (such as the internet) 260. As illustrated in FIG. 2, the satellite operations center 270 can be located remotely from the gateway 220. In such embodiments, communication between the satellite operations center 270 and the satellite 210 can be accomplished via the external networks and the gateway 220. According to various implementations, however, the satellite operations center 270 can also be co-located with the gateway 220. Such implementations eliminate the need to forward communication (e.g., telemetry signals) over the external networks.

Figure 3:
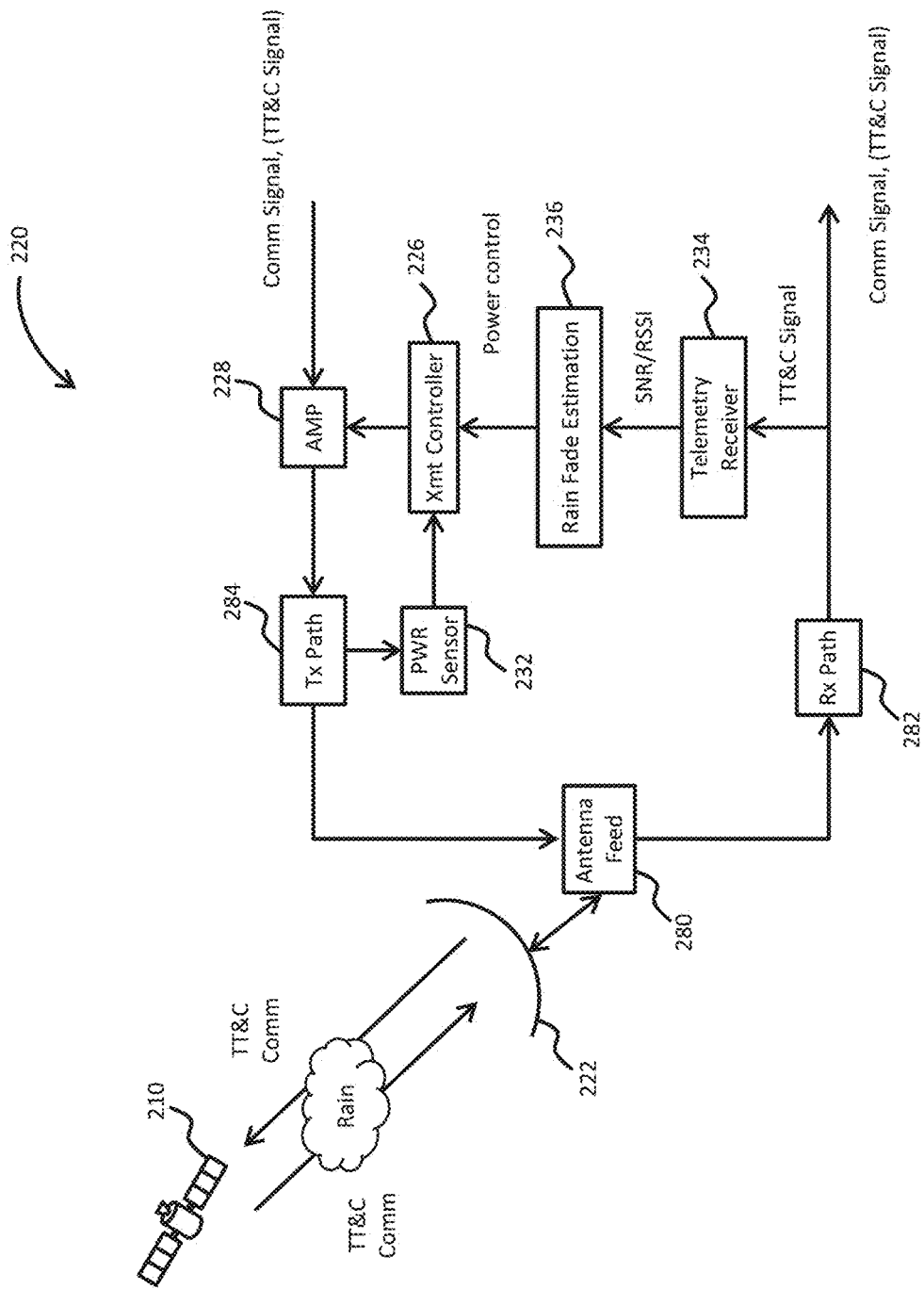
FIG. 3 is a diagram illustrating various components in the signal path of the system shown in FIG. 2, according to one embodiment.

FIG. 3 is a diagram illustrating various components in the signal path of the system shown in FIG. 2, according to one embodiment. According to the illustrated embodiment, the satellite 210 is transmitting Telemetry Tracking & Command (i.e., telemetry signals) along with communication signals that are received by an antenna feed unit 280 via the transmitter 222. The telemetry signals are then directed through a receive path unit 282. As previously discussed, the telemetry signals are typically in the form of a modulated carrier and used to transport payload data to ground equipment such as the satellite operations center. The telemetry receiver 234 collects information to obtain signal quality metrics such as signal noise ratio (SNR) and received signal strength indicator (RSSI). According to at least one implementation, the rain fade estimation unit 236 can be configured, for example, to utilize the signal quality metrics to estimate downlink rain fade by comparing with the measurements obtained in clear-sky. Uplink rain fade through a transmit path unit 284 can be predicted based on downlink rain fade estimation. Appropriate power adjustment can then be applied to the forward signal path to counteract the uplink rain fade.

According to at least one embodiment, the SNR-based rain fade estimation is used, for reasons that SNR is less sensitive to Rx path gain variations, and SNR estimation in noisy signal is more robust and unbiased. In order to estimate rain fade, knowledge of target SNR in clear-sky is required. Based on the quality metrics of the TT&C signal and satellite equivalent isotropic radiated power (EIRP), its SNR under clear-sky is given by:

$$SNR_{clearSky} = P_{TTC} - L_p - L_A + G - T_{clearSky} - 10 \times \log_{10} B - K \quad \text{Equation-1}$$

Where
$P_{TTC}$ is satellite EIRP for TT&C downlink signal in dBW
$L_p$ is free space propagation path loss in dB
$L_A$ is Atmospheric Gas Loss in dB
B is TT&C downlink signal bandwidth
K is Boltzmann constant, K=−228.6 dB (W/HzK)
G is the gateway antenna gain in dB
$T_{clearSky}$ is the gateway system noise temperature in dB (K) under clear-sky Under rain fade conditions, its SNR is given by:

$$SNR_{rain} = P_{TTC} - L_p - L_A - L_{rain} + G - T_{rain} - 10 \times \log_{10} B - K \quad \text{Equation-2}$$

Where
$L_{rain}$ is the rain fade in dB
$T_{rain}$ is the gateway system noise temperature in dB (K) under rain fade condition Comparing Equation-1 and Equation-2, we have:

$$\Delta SNR = L_{rain} + \Delta T \quad \text{Equation-3}$$

Where $$\Delta SNR = SNR_{clearSky} - SNR_{rain}$$

$$\Delta T = T_{rain} - T_{clearSky}$$

From Equation-3, it can be seen that SNR degradation under rain condition is attributed to both rain fade and the rise of system noise temperature. To estimated rain fade accurately, the system noise temperature change under the rain should be taken into account. The system noise temperature is typically based on gateway components such as the transmitter (or antenna), gateway receiver, and transmission line between the two. The system noise temperature can be given by:

$$T = 10\log_{10}\left[\frac{T_a}{L} + \left(1 - \frac{1}{L}\right)T_o + (NF - 1) * 290\right] \quad \text{Equation-4}$$

Where
T is the system noise temperature
$T_a$ is antenna noise temperature
L is the loss of transmission line
$T_o$ is transmission line temperature
NF is the noise figure of the receiver All the parameters in Equation-4 can be treated as constants except antenna noise temperature $T_a$, which is mainly determined by the atmospheric gas loss and rain fade. It should be noted that other less significant factors, such as ground noise temperature and Ohmic loss, have been omitted. The antenna noise temperature can then be given by:

$$T_a = T_m\left(1 - 10^{-\frac{L_A + L_{rain}}{10}}\right) \quad \text{Equation-5}$$

Where:
$T_m$ is the mean ambient temperature ranging from about 260K to 280K $L_A$ is atmospheric gas loss in dB at a given elevation angle and it is given by:

$$L_A = L_z / \sin(\alpha)$$

$L_z$ is atmospheric loss at zenith,
α is the elevation angle of gateway antenna
$L_{rain}$ is the rain fade in dB When $L_{rain}$=0 dB, $T_a$ in equation-5 represents the clear-sky antenna noise temperature. Therefore, the rise of noise temperature ΔT in equation-3 is given by:

$$\Delta T = 10\log_{10}\left[\frac{T_m\left(1 - 10^{-\frac{L_A + L_{rain}}{10}}\right) + (L-1)T_o + L(NF-1)*290}{T_m\left(1 - 10^{-\frac{L_A}{10}}\right) + (L-1)T_o + L(NF-1)*290}\right] \quad \text{Equation-6}$$

From Equation-6, it can be seen that the rise of system noise temperature is the function of rain fade $L_{rain}$. By substituting ΔT with Equation-6, Equation-3 can be solved to yield the solution for the rain fade $L_{rain}$, which is given by:

$$L_{rain} = 10\log_{10}\left\{\frac{\left[T_m\left(1 - 10^{-\frac{L_A}{10}}\right) + (L-1)T_o + L(NF-1)*290\right] * 10^{\frac{\Delta SNR}{10}} + T_m 10^{-\frac{L_A}{10}}}{T_m + (L-1)T_o + L(NF-1)*290}\right\} \quad \text{Equation-7}$$

An issue with SNR estimation is its susceptibility to interference signal. If not handled properly, the SNR degradation due to the interference signal could be misinterpreted as rain fade and lead to erroneous power increase and interference to other systems. According to various embodiments, the interference protection method advantageously improves the system's ability to detect interference scenario to ensure no power increase is applied.

The fundamental of the proposed method is based on noise power monitoring. Based on the RSSI and SNR measurements from TT&C receiver, the composite noise power and interference power, represented by N+I, can be estimated using the following formula:

$$N + I = \frac{RSSI}{1 + SNR} \quad \text{Equation-8}$$

Under interference-free clear-sky conditions, N+I from Equation-8 is approximately constant. At the presence of interference signals, N+I estimated from equation-8 increases with the power of interference signal. However, the increase of N+I cannot be used exclusively as the indication of interference's presence, since rain fade could also lead to the increase of N+I due to the increase of noise temperature as indicated by Equation-6. Therefore, certain test criteria is required to allow distinguishing interference from rain scenarios.

Given that RSSI is sensitive to gain variations under different temperature, the noise power estimated from Equation-8 is expected to vary with RSSI. However, in case of LEO (Low Earth Orbit) systems, the fly-over time of a satellite over a given gateway is short (for example about 18 minutes for a LEO satellite with altitude of 1200 km), it is reasonable to assume that the gain for receiver chain is constant as temperature is not expected to vary significantly within fly-over time period. Therefore, noise power under normal condition should be constant under clear sky.

Figure 4:
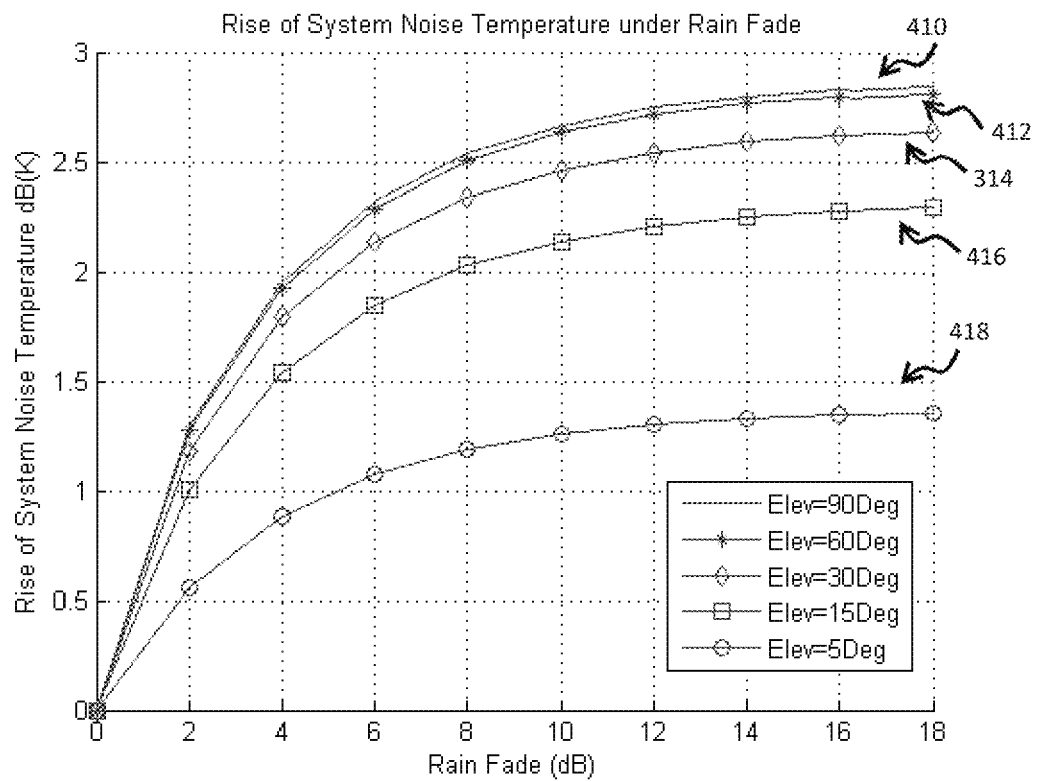
FIG. 4 is a plot showing the rise in system noise temperature with rain fade, according to one embodiment.

FIG. 4 is a plot showing the rise in system noise temperature with rain fade, according to one embodiment. Under rain fade, the noise power increases due to the increase of noise temperature. Based on Equation-6, FIG. 4 plots the rise of noise temperature ΔT vs. rain fade $L_{rain}$ under the following conditions:

$T_m$=275K
NF=1.5 (~1.76 dB)
L=1.26 (~1 dB)
$T_c$=310K
$L_z$=0.24 dB (corresponding to ~29 GHz)

Plot 410 corresponds to an elevation angle of 90°, plot 412 corresponds to an elevation angle of 60°, plot 414 corresponds to an elevation angle of 30°, plot 416 corresponds to an elevation angle of 15°, and plot 418 corresponds to an elevation angle of 5°. It can be seen that the rise of noise power under extreme rain fade is within 3 dB as shown in FIG. 4. According to at least on embodiment, the interference can be determined as follows: if noise power from Equation-8 increases by more than 3 dB, the case is treated as the high interference and no power adjustment is applied. In case of low interference where noise increases by less than 3 dB, interference case cannot be easily distinguished from rain fade scenario based on the noise power variation. Various embodiments, however, incorporate a delayed response power methodology which does not require an increase in transmit power for SNR degradation of 3 dB or less.

According to an embodiment, the uplink rain fade can be derived from downlink rain fade based on ITU recommended approach, the entire contents of which are hereby incorporated by reference. In a typical satellite system, a forward radio link consists of feederlink from gateway to satellite and service link from satellite to user terminals. Its end-to-end radio link SNR is given by:

$$SNR_{EtE} = \frac{1}{\frac{1}{SNR_1} + \frac{1}{SNR_2}}$$

Where:
$SNR_{EtE}$ is the end-to-end forward link SNR
$SNR_1$ is the feederlink SNR
$SNR_2$ is the service link SNR Typical feederlink SNR exhibits much better performance than service link SNR due to higher EIRP from gateway and satellite G/T performance, and consequently the end-to-end forward link SNR is usually predominated by service link SNR. Therefore, small changes in feederlink SNR (as a result of rain fade, for example) will not have significant impact on the overall end-to-end radio link SNR.

Figure 5:
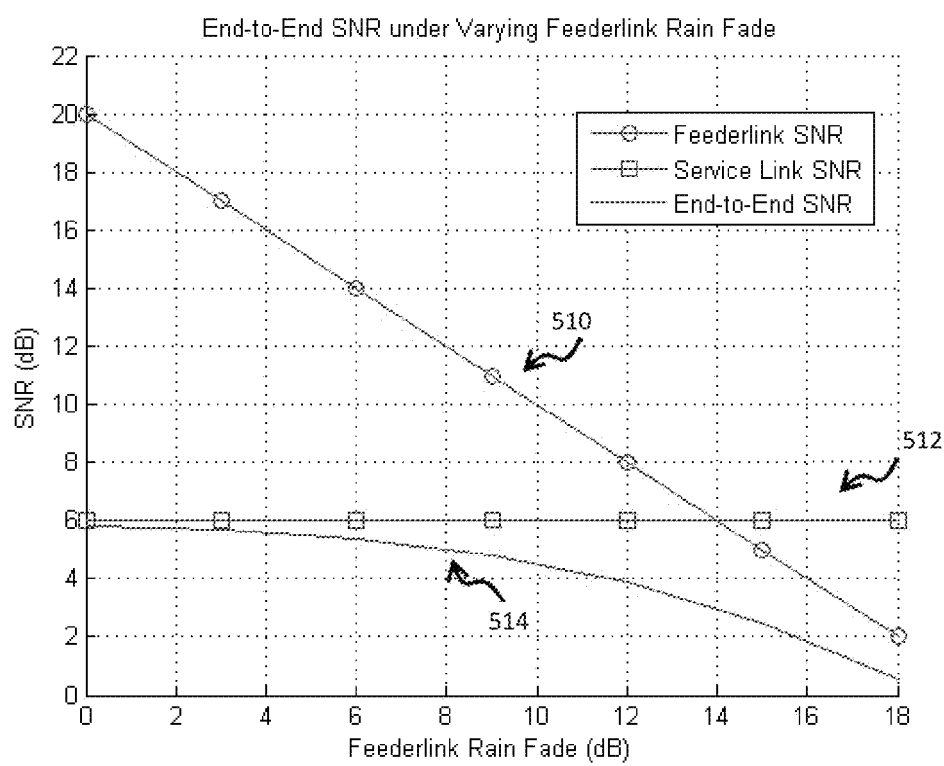
FIG. 5 is a plot showing forward end-to-end radio link signal to noise ratio under feederlink rain fade, according to one embodiment.

FIG. 5 is a plot showing forward end-to-end radio link signal to noise ratio under feederlink rain fade, according to one embodiment. Line 510 represents the SNR for the feederlink under atmospheric conditions ranging from clear sky to 18 dB of rain fade. Line 512 represents the SNR for the service link under the same atmospheric conditions. Line 514 represents end-to-end SNR for the forward link from the gateway to the terminal. As can be seen, feederlink SNR 20 dB under clear-sky conditions and 2 dB under high rain fade conditions of 18 dB. The service link SNR, however, remains relatively constant at 6 dB. It can be seen that the end-to-end forward link SNR degrades less than 1 dB under up to 6 dB feederlink rain fade. Accordingly, it is not necessary to perform power adjustments for the first 6 dB of rain fade.

Figure 6:
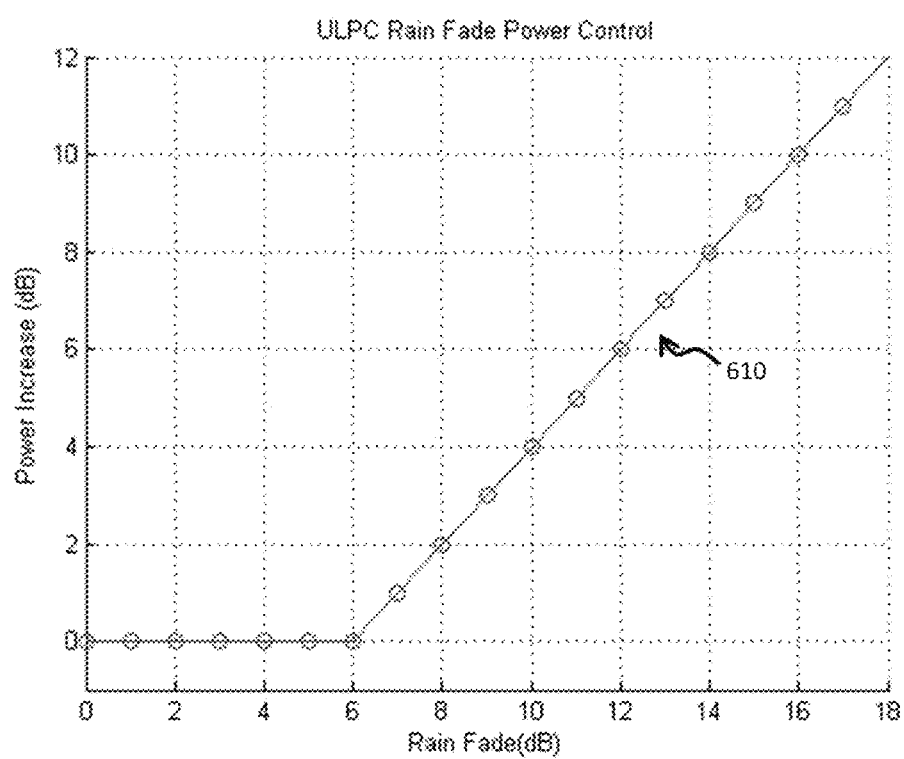
FIG. 6 is a plot showing application of a delayed-response power control scheme, according to one embodiment.

FIG. 6 is a plot 610 showing application of a delayed-response power control scheme, according to one embodiment. Given the observation that end-to-end forward link SNR is generally insensitive to the feederlink rain fade if it is relatively small (less than 6 dB), a delayed-response scheme for uplink power control is proposed. In this scheme, uplink power control starts to respond only if the uplink rain fade is greater than 6 dB. For example, if 8 dB or rain fade is present, power adjustments are only made to compensate for 2 dB instead of 8 dB. If the power headroom of the amplifier is 12 dB, it becomes possible to compensate for the entire 18 dB range of rain fade shown in FIG. 6. In contrast, if power adjustments are initiated at 1 dB of rain fade, would result in negligible improvements. However, the amplifier would only be able to compensate for 12 dB or rain fade instead of the full 18 dB of rain fade.

Figure 7:
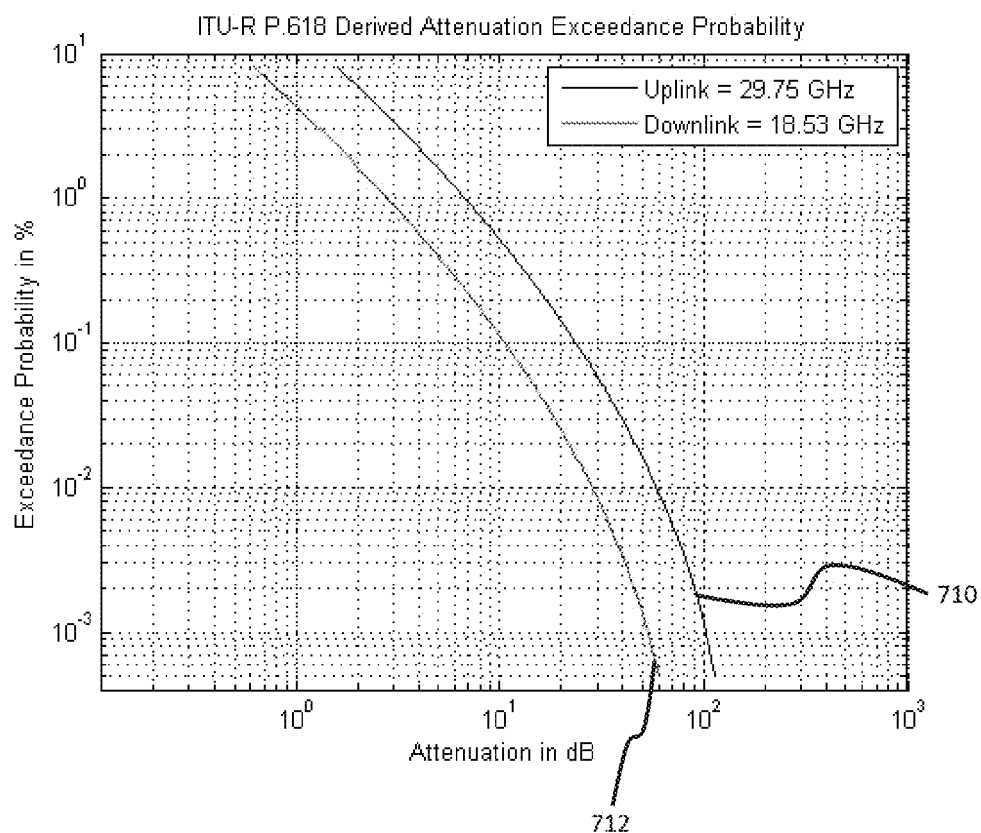
FIG. 7 is a plot showing rain fade exceedance probability for a specific geographic location, according to one embodiment.

FIG. 7 is a plot showing rain fade exceedance probability for a specific geographic location, according to one embodiment. Curve 712 represents a downlink signal at 18.53 GHz, and curve 714 represents a corresponding uplink signal at 29.75 GHz. The delayed response has minimum impact on forward SNR performance while reducing the amount of time when the amplifier has to operate at the higher power levels. To quantify the benefit, the rain fade probability at a location near Lansing, Mich., USA is studied. From FIG. 7, the following rain fade probabilities can estimated:

P(rainFade>1 dB)=10%, or P(clearSky)≈P(rainFade<1 dB)=90%

P(rainFade>6 dB)=1.1%, or P(rainFade<6 dB)=100%−1.1%=98.9%

P(rainFade>12 dB)=0.4%, or P(rainFade<12 dB)=100%−0.4%=99.6%

Therefore, we have the following probabilities:

P(0 dB<rainFade<6 dB)=(98.9−90)%=8.9%

P(6 dB<rainFade<12 dB)=(99.6−98.9)%=0.7%

It can be seen that with the delayed-respond power control scheme the probability of a Power Amplifier (PA) operating in active uplink power control state is reduced from 8.9% to 0.7%. This brings potential benefits such as lower interference, improved NPR for non-linear PA, and lower power consumption. In addition, the scheme desensitizes to the SNR estimation error and also reduces power overshoot interference which might occur when rain stops abruptly. In order to avoid interference under faster rain rate variation, other prudent measures such as slow power increase and fast power decrease can also be considered when calculating power adjustment.

Figure 8:
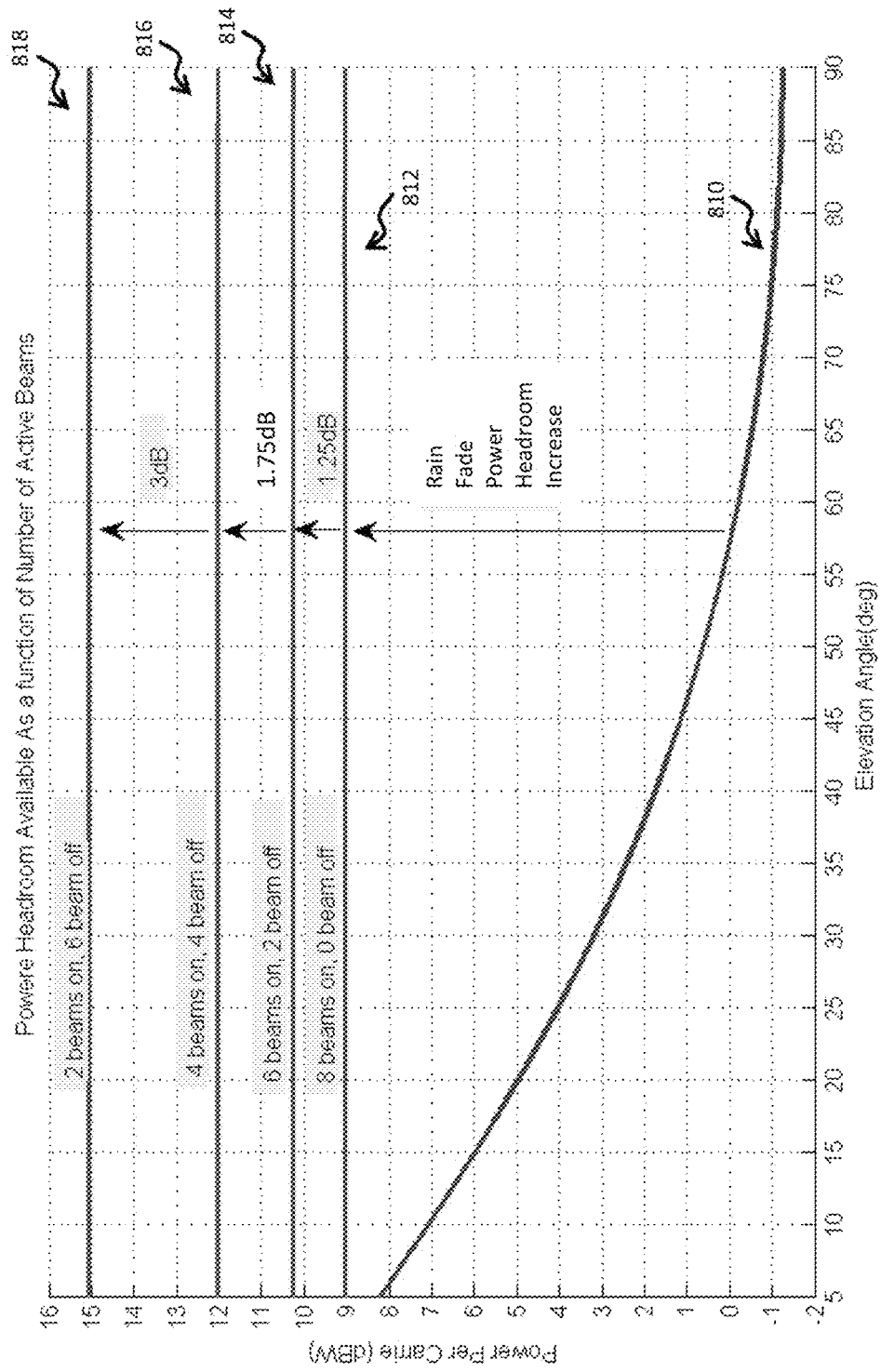
FIG. 8 is a plot illustrating available power headroom relative to active beams, according to one embodiment.

FIG. 8 is a plot illustrating available power headroom relative to active beams, according to at least one embodiment. Curve 810 represents the amount of power required to amplify the signals from all beams and/or carriers supported by the power amplifier. As can be seen, the power requirement varies based on the elevation angle of the transmitter for the same orbital height. For example, the distance between the gateway and satellite is much greater at lower elevation angles, thereby having higher power requirements for the same number of beams relative to higher elevation angles. More particularly, as the elevation angle of the transmitter increases from 5° to 90°, the amount of power required for all 8 beams decreases. As can be appreciated, each power amplifier is designed and manufactured to provide a specific amount of power. As the power rating increases, the actual cost of the amplifier will increase correspondingly. Additional components may also be required to support the higher levels of power, thereby further increasing system cost, complexity, and reliability. For example, larger power amplifiers generate greater amounts of heat and therefore require additional components to maintain normal operating temperatures. It is therefore important to select the amplifiers such that they are capable of supplying the necessary amount of power to support all of the beams, while leaving some headroom to avoid continuous operation at peak levels.

According to the embodiments illustrated in FIG. 8, the transmitter is adjusted to an elevation angle of 58° to communicate with the satellite. Line 812 illustrates the available power from the amplifier if all 8 beams are active. The distance between curve 810 and line 812 at an elevation angle of 58° corresponds to the amount of power headroom available to the amplifier to reduce or eliminate any attenuation in the communication signal caused by rain. Specifically, the amplifier is capable of supplying an additional 9 dB of transmission power to combat signal attenuation (i.e., rain fade) if all 8 beams supported by the amplifier are currently active.

During normal operations, it is often necessary to deactivate one or more beams in a satellite communication system and discontinue transmissions from the gateway to the satellite on the deactivated beams. This may be required for various reasons. Signal transmission to one satellite can adversely affect operation of adjacent satellites if their orbits are close to each other or the transmission power is too high. Furthermore, various government entities set specific guidelines for the maximum amount of power that can be used in order to avoid adverse effects to adjacent satellite. Low Earth Orbit (LEO) satellites change their positions relative to the gateway 220. Such changes can bring these satellites in close proximity to other LEO satellites. More particularly, as LEO satellites go up in latitude (approaching the poles), their orbits get closer to each other. In order to avoid transmission overlap (self-interference) between adjacent satellites, certain beams in the satellite can be turned off at high latitudes. As they approach the equator, their orbits move away from each other. Certain beams are also turned off at lower latitudes to prevent go-interference.

According to at least one embodiment, the amount of power headroom available from the amplifier can be dynamically adjusted based, at least in part, on the number of beams that have been temporarily deactivated. For example, the amplifier has a fixed amount of power available that is equally divided and allocated to each beam which it supports. When a beam is inactive, the same power allocation is reserved, but not used. According to one or more embodiments, the power reserved for inactive beams can be reallocated so that the amount of power headroom available to active beams can be increased. Line 814 illustrates the available power from the amplifier for 6 active beams. Thus, if the power reserved for two active beams is reallocated to support the 6 active beams, the power headroom available for the 6 active beams is increased by 1.25 dB, for a total of 9.25 dB. Line 816 similarly shows the available power from the amplifier if all 4 beams are active, i.e., when 2 additional beams are deactivated. As illustrated in FIG. 8, and additional 1.75 dB of power headroom can be gained by the amplifier if power reserved for the 2 additional inactive beams is reallocated to the 4 active beams. The total amount of additional power headroom available for 4 active beams is increased by 3 dB (1.25+1.75). If 2 more beams are deactivated, and additional 3 dB of power headroom can be reallocated to the remaining 2 active beams. This results in a total of 6 dB of additional power headroom available to combat signal attenuation resulting from rain fade for the 2 active beams. The total power headroom for the amplifier thus increases to 15 dB (9 base+6 additional) for the 2 active beams. Such an increase corresponds to approximately a 66% increase in power headroom from the amplifier which would otherwise not be available, if the power reserved for the 6 inactive beams was not reallocated.

Figure 9:
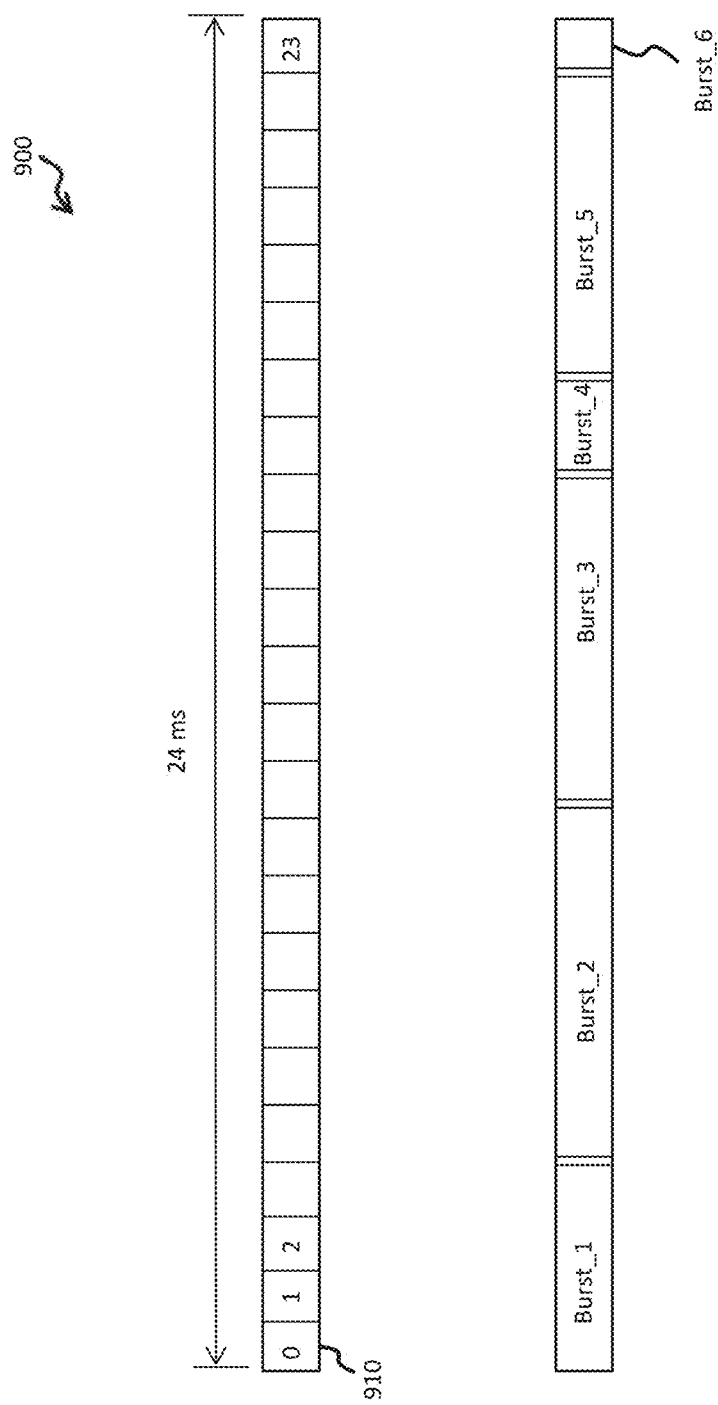
FIG. 9 is a diagram illustrating a configuration for a conventional transmit frame.

FIG. 9 is a diagram illustrating a configuration for a conventional transmit frame 900 having a length of 24 ms. The transmit frame 900 contains twenty four (24) equally spaced time slots 910. Each time slot 910 is therefore 1 ms in length. FIG. 9 also illustrates an arrangement of multiple bursts within the transmit frame 900. One or more time slots 910 can be assigned to each burst depending on various conditions. For example, Burst_1 contains four time slots, and has a length of 4 ms. Burst_2 contains six time slots and has a length of 6 ms. Similarly, Burst_3, Burst_4, Burst_5, and Burst_6 have lengths of six time slots, two time slots, five time slots, and 1 time slot, respectively.

The amount of user traffic within each beam can vary depending on a number of factors. Satellite beams can often have very large footprint (or coverage area). Depending on the particular region covered by the beam, the amount of user traffic can be quite different. Beams that cover densely populated areas, for example, may contain higher traffic levels than beams that cover the very rural areas. It is typically not necessary to transmit on beams with low user traffic all the time.

According to at least one embodiment, the amount of traffic carried by each beam can be used as a criteria to dynamically adjust the amount of power headroom available to the amplifier. This can be accomplished, for example, by staggering the transmission schedule across the different beams in order to reduce or avoid simultaneous transmissions on all beams. For example, each beam can be assigned time slots on the transmit frame in order to reduce simultaneous transmissions. Consider a situation in which each of the 8 beams supported by the amplifier only contains data sufficient to occupy ⅛th of the transmit frame. If data from each beam is simultaneously transmitted, all the power available from the amplifier would be used during ⅛th of the transmit frame. No power is would be utilized from the amplifier during the remaining ⅞th of the transmit frame because none of the beams are active.

Figure 10A:
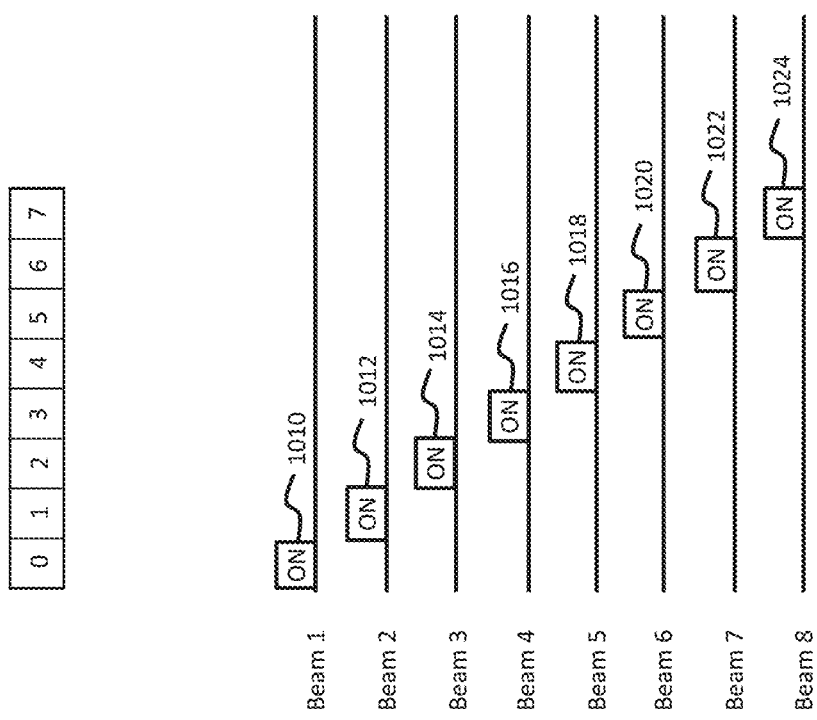
FIG. 10A is a diagram illustrating staggered arrangement of beam traffic, according to at least one embodiment.
Figure 10B:
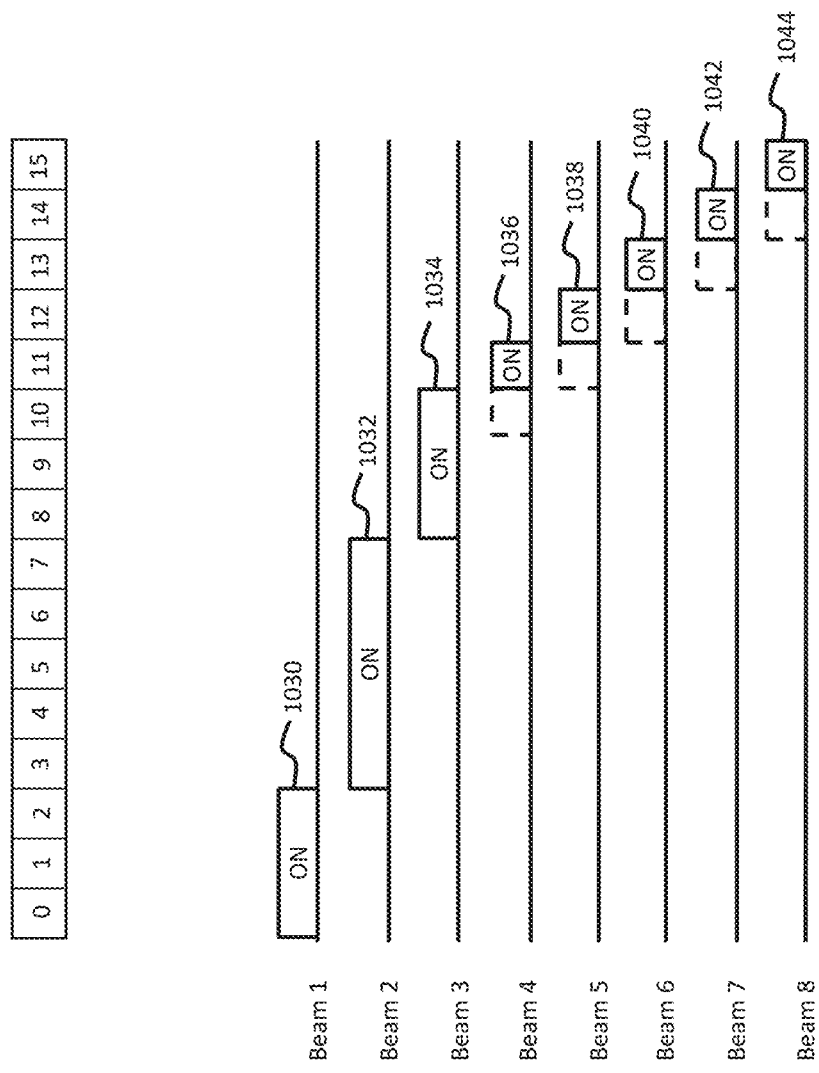
FIG. 10B is a diagram illustrating staggered arrangement of beam traffic, according to various embodiments.

FIGS. 10A and 10B illustrate the manner in which beam transmissions can be staggered in accordance with various embodiments. According to the illustrated embodiment, the transmissions on individual beams are staggered such that each beam independently active for ⅛th of the transmit frame. If the transmit frame is divided into 8 time slots with each burst being equal to one time slot, for example, the data 1010 from beam 1 would be transmitted on a burst which occupies the first time slot. As illustrated in FIG. 10A, only the data 1010 from beam 1 is active. No data from the remaining 7 beams are transmitted on the first time slot. Accordingly, the additional power headroom from the remaining seven beams can be utilized by the amplifier for beam 1. Similarly, data 1012 from beam 2 is transmitted on a burst which occupies the second time slot, data 1014 from beam 3 is transmitted on a burst which occupies the third time slot, data 1016 from beam 4 is transmitted on a burst which occupies the fourth 4th time slot, data 1018 from beam 5 is transmitted on a burst which occupies the fifth time slot, data 1020 from beam 6 is transmitted on a burst which occupies the sixth time slot, data 1022 from beam 7 is transmitted on a burst which occupies the seventh time slot, and data 1024 from beam 8 is transmitted on a burst which occupies the eight time slot. As illustrated in FIG. 10A, only one beam is actively transmitting during any of the previously discussed eight time slots.

According to various embodiments, however, the number of time slots assigned to each beam can vary depending on the level of traffic within a particular beam relative to the other beams. This can be accomplished by adjusting the number of time slots allocated to each burst assigned to the beams. FIG. 10B further illustrates an embodiment wherein beam 4-beam 8 currently have approximately the same level of traffic, while beam 3 has a slightly higher level of traffic. Beam 1 and beam 3 are carrying a higher level of traffic than beam 4-beam 8, and beam 2 is carrying the highest level of traffic. The transmit frame is divided into fourteen time slots. Data 1030 from beam 1 is transmitted on a burst that occupies 3 time slots. Data 1032 from beam 2 is transmitted on a burst that occupies 5 time slots. Data 1034 from beam 3 is transmitted on a burst that occupies 3 time slots. Data from beam 4-beam 8 (1036, 1038, 1040, 1042, 1044) are each transmitted on bursts that occupy a single time slot. Regardless of the size of the burst assigned to the beam, FIG. 10B illustrates only one beam transmitting during its assigned burst.

According to various embodiments, however, the traffic load across all 8 beams may not facilitate staggering the transmissions such that only one beam is actively transmitting. Thus, it may be necessary to overlap the transmission of two or more beams during the same time slots. The total amount of additional power headroom available would therefore decrease based on the number of overlapping transmissions. For example, if beam 4-beam 8 were each transmitted on bursts that occupy two time slots, an overlap of two beams would exist during the final 6 time slots, as indicated by the dashed lines.

While FIGS. 10A and 10B illustrate embodiments wherein the transmit frame contains 8 and 14 time slots, it should be noted that other configurations can also be used. Specific implementations can set fixed sizes for the transmit frames such as 20 ms, 30 ms, 40 ms, etc. The total number of time slots allocated to each transmit frame can also be a fixed fraction of the transmit frame. For example, a transmit frame that is 20 ms in length can include 20 time slots that are 1 ms in length. Additionally, it is possible for bursts to extend across transmit boundaries.

When the traffic level is measured for each beam, the transmit controller and/or the CPU can determine the appropriate number of time slots that should be allocated to each burst based on the traffic level. The number of time slots used in the exemplary embodiments, therefore, are not intended to be limiting in any way.

Figure 11:
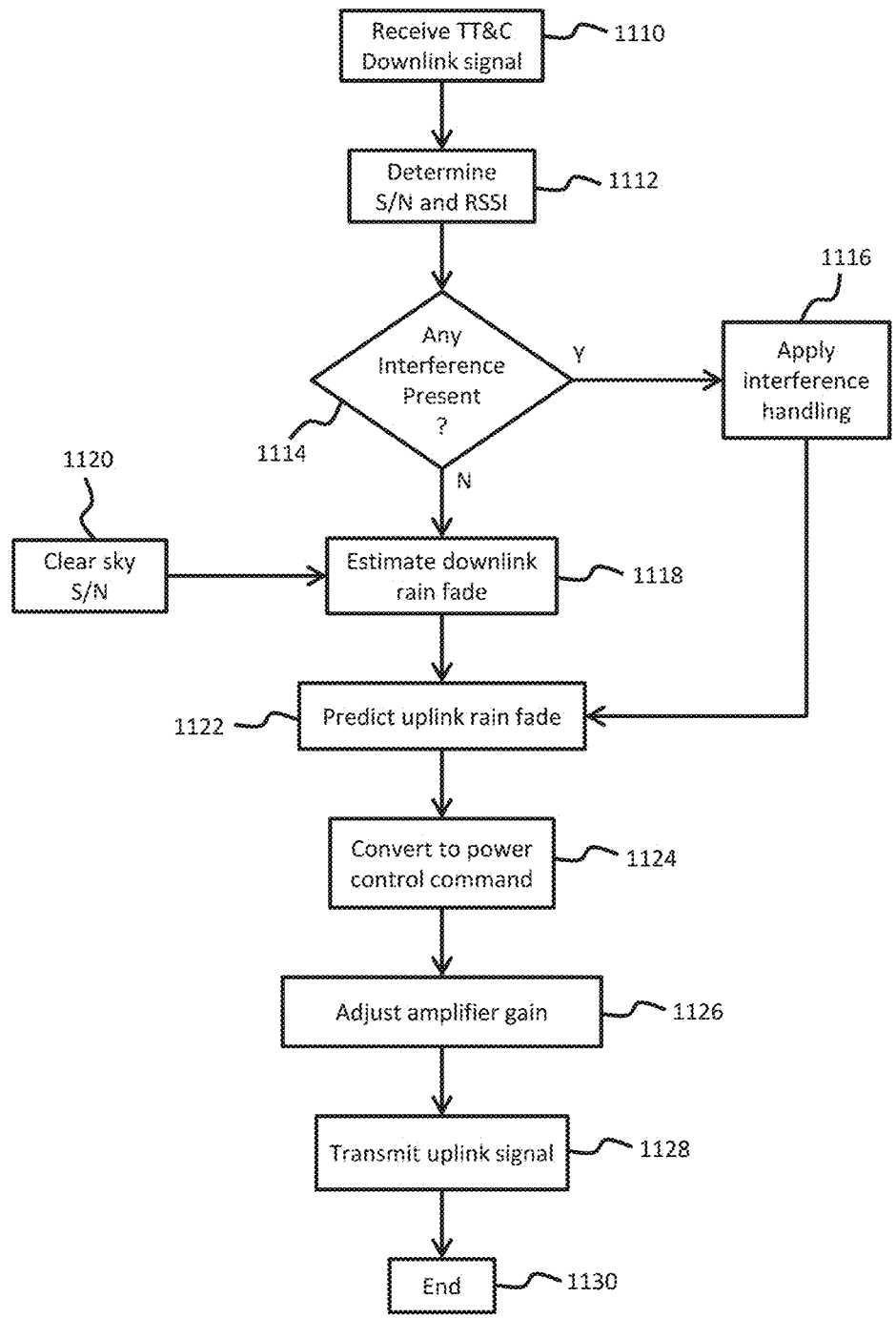
FIG. 11 is a flowchart illustrating steps performed while applying uplink power control, according to one embodiment.

FIG. 11 is a flowchart illustrating steps performed while applying uplink power control, according to one embodiment. At 1110, the downlink TT&C signal is extracted and presented to the TT&C receiver. According to at least one embodiment, the TT&C receiver measures the signal quality metrics from the TT&C downlink signal, at 1112, by determining the SNR and RSSI. At 1114 the noise power calculated based on RSSI and SNR is checked against a predetermined amount to determine if the SNR drop is the result of interference or the rain fade. If it is caused by interference, control passes to 1116, where the downlink rain fade estimation is set to 0 dB so that no power adjustment is applied. Control then passes to 1122. If the SNR drop is not caused by interference, a downlink rain fade estimation is performed at 1118. The SNR under clear sky conditions can be supplied at 1120 to estimate the downlink rain fade. Based on the downlink rain fade estimation, the uplink rain fade is predicted at 1122. According to at least one embodiment, the uplink rain fade can be predicted in accordance with the ITU recommendations. At 1124, the uplink rain fade is converted to an actual power adjustment value that is representative of the uplink rain fade. The power adjustment is supplied to the amplifier at 1126 in order to control the output power. At 1128, the uplink signal is transmitted. The process ends at 1130.

Figure 12:
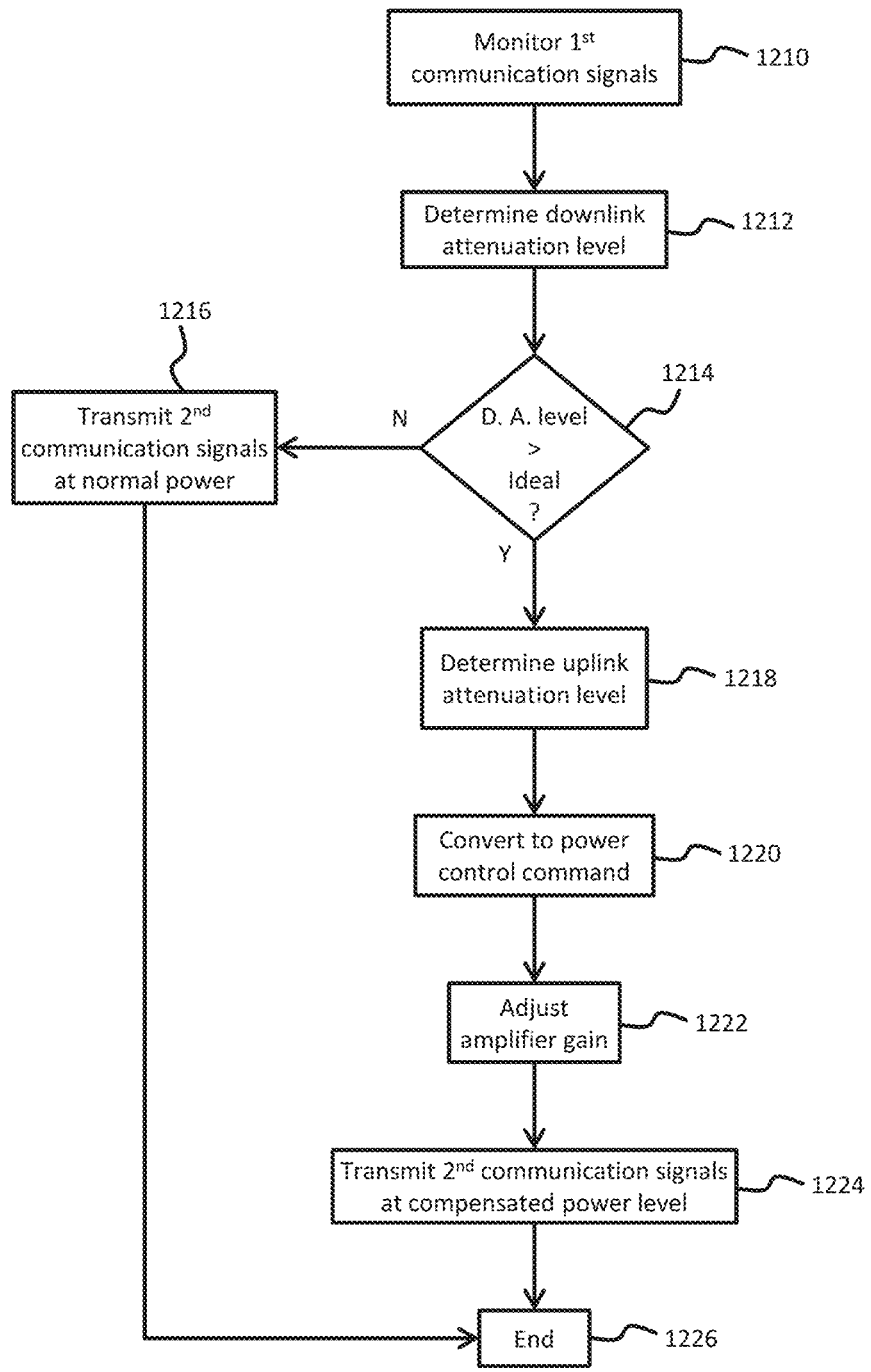
FIG. 12 is a flowchart illustrating steps performed while applying uplink power control, according to another embodiment.

FIG. 12 is a flowchart illustrating steps performed while applying uplink power control, according to another embodiment. At 1210, first communication signals are monitored. As previously discussed, the first communication signals can correspond to telemetry signals received from the satellite at the gateway. Such telemetry signals are subsequently forwarded to the satellite operations center. According to at least one embodiment, the first communication signals can be monitored by the transmit controller. According to other embodiments, the first communication signals can be monitored by the telemetry receiver. At 1212, the downlink attenuation level of the first communication signals is determined. The downlink attenuation level can be determined, for example, by the transmit controller or the telemetry receiver. According to at least one embodiment, the CPU 224 can also be configured to determine the downlink attenuation level.

At 1214, the downlink attenuation level is compared to an ideal attenuation level. The ideal attenuation level can correspond, for example, to the expected level of attenuation under clear skies. If the downlink attenuation level is not greater than the ideal attenuation level, control passes to 1216. The second communication signals are then transmitted to the satellite at a normal power level. As previously discussed, the second communication signals can correspond to all communication (user data, telemetry data, etc.) from the gateway to the satellite. If the downlink attenuation level is greater than the ideal attenuation level, control passes to 1218 where an uplink attenuation level is determined. The uplink attenuation level corresponds to the amount of attenuation that would be expected based on the frequency that is being used. As previously discussed, the communication signals from the satellite to the gateway are transmitted at a different frequencies from those used to transmit communication signals from the gateway to the satellite. Thus, the same amount of rain can result in a different attenuation level, depending on the direction of the communication signal. Depending on the specific implementation, the uplink attenuation level can be determined by the rain fade estimation unit. Additionally, the CPU can be configured to determine the uplink attenuation level.

At 1220, the uplink attenuation level is converted to a power control command. At 1222, the gain from the amplifier is adjusted based on the power control command. For example, the power control command can have a value of 5, which results in increasing the gain of the amplifier by 10%. The amplifier gain is used to increase the strength of the second communication signals in order to compensate for (or reduce) the amount of attenuation resulting from rain fade. At 1224, the second communication signals are transmitted to the satellite at the compensated power level. The process ends at 1226.

Figure 13A:
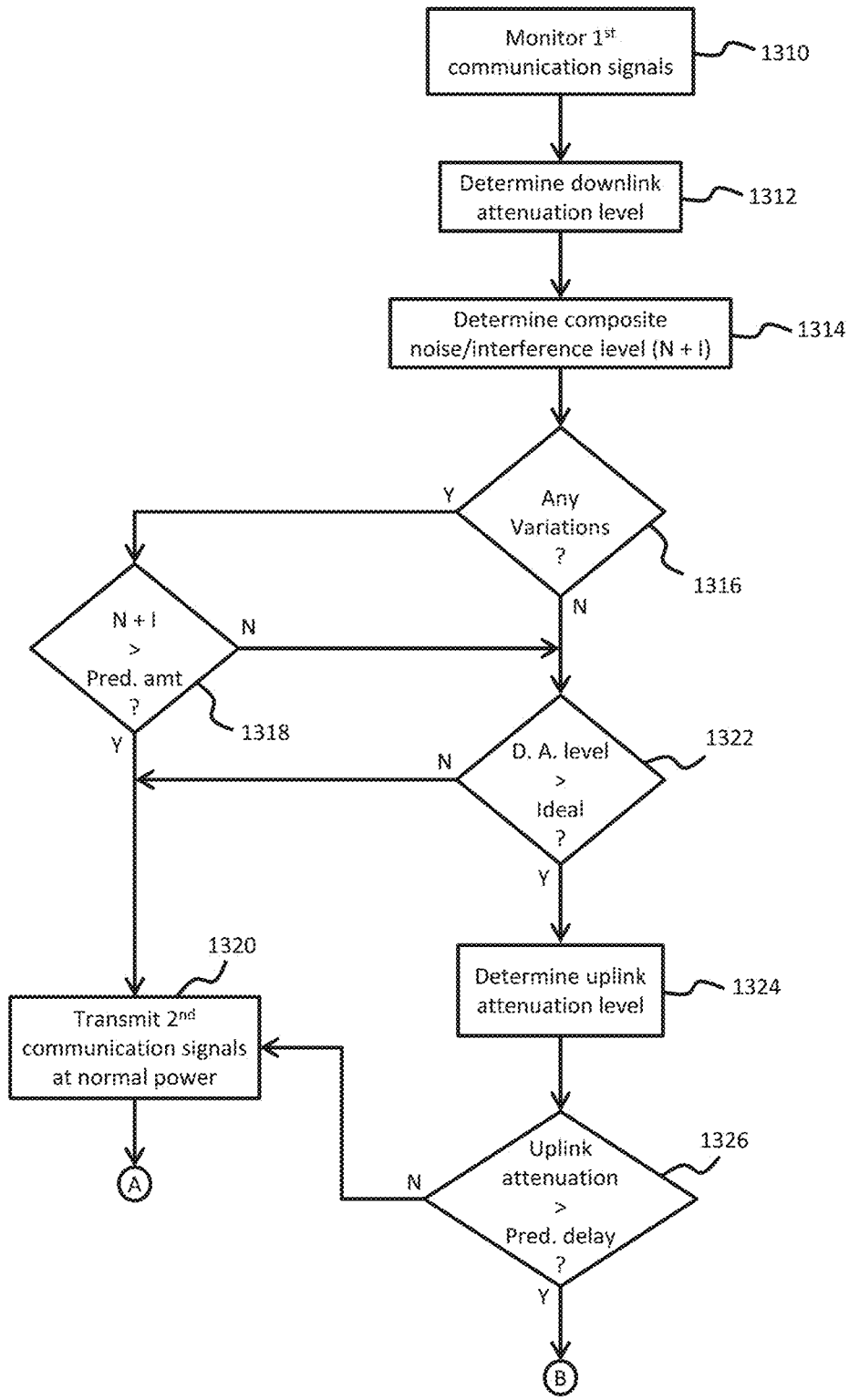
FIGS. 13A and 13B are a flowchart illustrating steps performed while applying uplink power control, according to various embodiments.
Figure 13B:
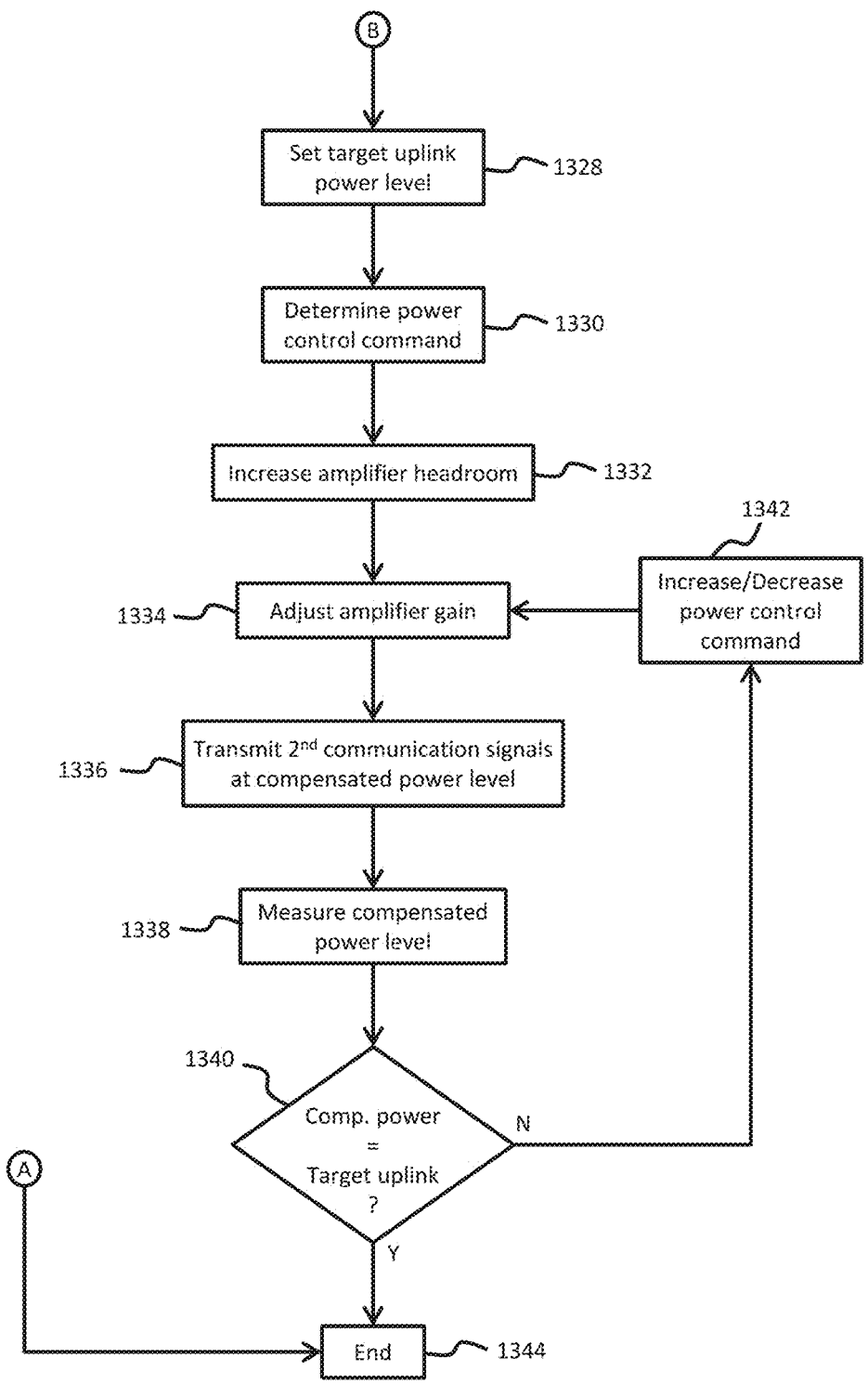

FIGS. 13A and 13B are a flowchart illustrating steps performed while applying uplink power control, according to various embodiments. At 1310, first communication signals are monitored. The first communication signals can correspond to telemetry signals received from the satellite at the gateway. Depending on the specific implementation, the telemetry signals can be forwarded to a satellite operations center that is remotely located from, or co-located with, the gateway. At 1312, the downlink attenuation level for the first communication signals is determined using, for example, the transmit controller, the telemetry receiver, the CPU, or a combination thereof. At 1314, a composite noise and interference level is determined for the first communication signals. According to at least one embodiment, the rain fade estimation unit can determine the composite noise and interference level. According to other embodiments, the CPU 224 can be configured to determine the composite noise and interference level.

At 1316, the composite noise and interference level is analyzed over time in order to determine whether any variations are present. If there are any variations in the composite noise and interference level, control passes to 1318. The composite noise and interference level is compared to a predetermined amount. The predetermined amount can correspond, for example, to a decibel level indicative of high interference. According to at least one embodiment, the predetermined amount can correspond to an amount of variation for the composite noise and interference level that is indicative of high interference. If the composite noise and interference level is greater than the predetermined amount, the second communication signals are transmitted at normal power levels. This is indicated at 1320.

If no variations are detected in the composite noise and interference level, or if the composite noise and interference level is less than the predetermined amount, control passes to 1322. This can correspond to a situation where the amount of noise or interference present in the first communication signal cannot be easily distinguished from rain fade. At 1322, the downlink attenuation level is compared to an ideal attenuation level. If the downlink attenuation level is not greater than the ideal attenuation level, control returns to 1320 where the second communication signals are transmitted at normal power levels. If the downlink attenuation level is greater than the ideal attenuation level, control passes to 1324, where the uplink attenuation level is then determined.

At 1326, the uplink attenuation level is compared to a predetermined delay level. As previously discussed, various embodiments delay application of any signal compensation until a certain level of attenuation has been reached. This is due, at least in part, to the amount of attenuation that can be tolerated on the feeder link signal without significantly affecting the end-to-end signal-to-noise ratio of the forward link from the gateway to the terminal. According to at least one embodiment, the predetermined delay level can be set to 6 dB. Thus, the power headroom available to the amplifier can be reserved to compensate for higher levels (i.e., greater than 6 dB) of attenuation that can adversely affect the end-to-end signal-to-noise ratio.

If the uplink attenuation level is not greater than the predetermined delay, control again returns to 1320 where the second communication signals are transmitted at normal power levels. If the uplink attenuation level is greater than the predetermined delay level, then control passes to 1328 where a target uplink power level is set. The target uplink power level can correspond, for example, to an actual signal power level desired for reducing or eliminating attenuation resulting from rain fade. At 1330, a power control command is determined based, at least in part, on the target uplink power level. The power control command is intended to adjust the amplifier output for purposes of achieving the target uplink power level.

At 1332, the power headroom available in the amplifier is increased. Since the amount of power available from the amplifier is fixed, it is possible that the gain cannot be increased sufficiently to achieve the target uplink power level. The amplifier would therefore utilize the maximum amount of gain available until another power control command is applied, for example, to decrease the gain from the amplifier. According to the illustrated embodiment, however, by increasing the amount of power headroom available to the amplifier, the level of gain attainable from the amplifier is also increased. This can advantageously allow the amplifier to achieve a level of gain capable of achieving higher target uplink power levels, that would not be achievable without the additional power headroom. At 1334, the gain from the amplifier is increased in accordance with the power control command. At 1336, the second communication signals are transmitted at a compensated power level. The compensated power level can correspond, for example, to the power level resulting from adjusting the gain of the amplifier.

As previously discussed, the power control command is in the form of a value which causes the power amplifier to adjust its gain by a particular amount (e.g., percentage, fixed value, etc.). Typically, the amplifier is calibrated such that the power control command can be selected to adjust the gain for achieving the target uplink power level. Various conditions, such as equipment age, temperature, etc., can affect the actual gain from the amplifier. According to one or more embodiments, the system can verify that the compensated power level actually corresponds to the target uplink power level. For example, at 1338, the compensated power level can be measured. According to various implementations, this can be achieved using the power sensor. At 1340 the compensated power level is compared to the target uplink power level. Depending on the specific implementation, certain tolerance levels (e.g., 1 dB, 2 dB, etc.) can be allowed between the compensated power level and the target uplink power level. Thus, if the tolerance level is 1 dB and the compensated power level is 76 dBW, it would be considered equal to a target uplink power level of 75 dBW. If the compensated power level is equal to the target uplink power level, control passes to 1344 where the process ends. Since the system is under continuous operation, however, the process would be continually repeated to detect, and provide real-time compensation for, rain fade.

If the compensated power level does not equal the target uplink level, control passes to the 1342. At 1342, the power control command is increased or decreased depending on whether the compensated power level was lower than or higher than the target uplink power level. More particularly, if a target uplink power level is set at 75 dBW, and the measured compensated power level is 70 dBW, then the power control command would be raised in order to increase the level of gain from the amplifier. Conversely, if the measured compensated power level is 80 dBW, then the power control command would be lowered so that the amplifier gain would decrease. Control would then return to 1334 where the power control command is applied to adjust the gain of the amplifier. If the compensated power level is equal to the target uplink power level, then control passes to 1344 were the process ends.

Figure 14:
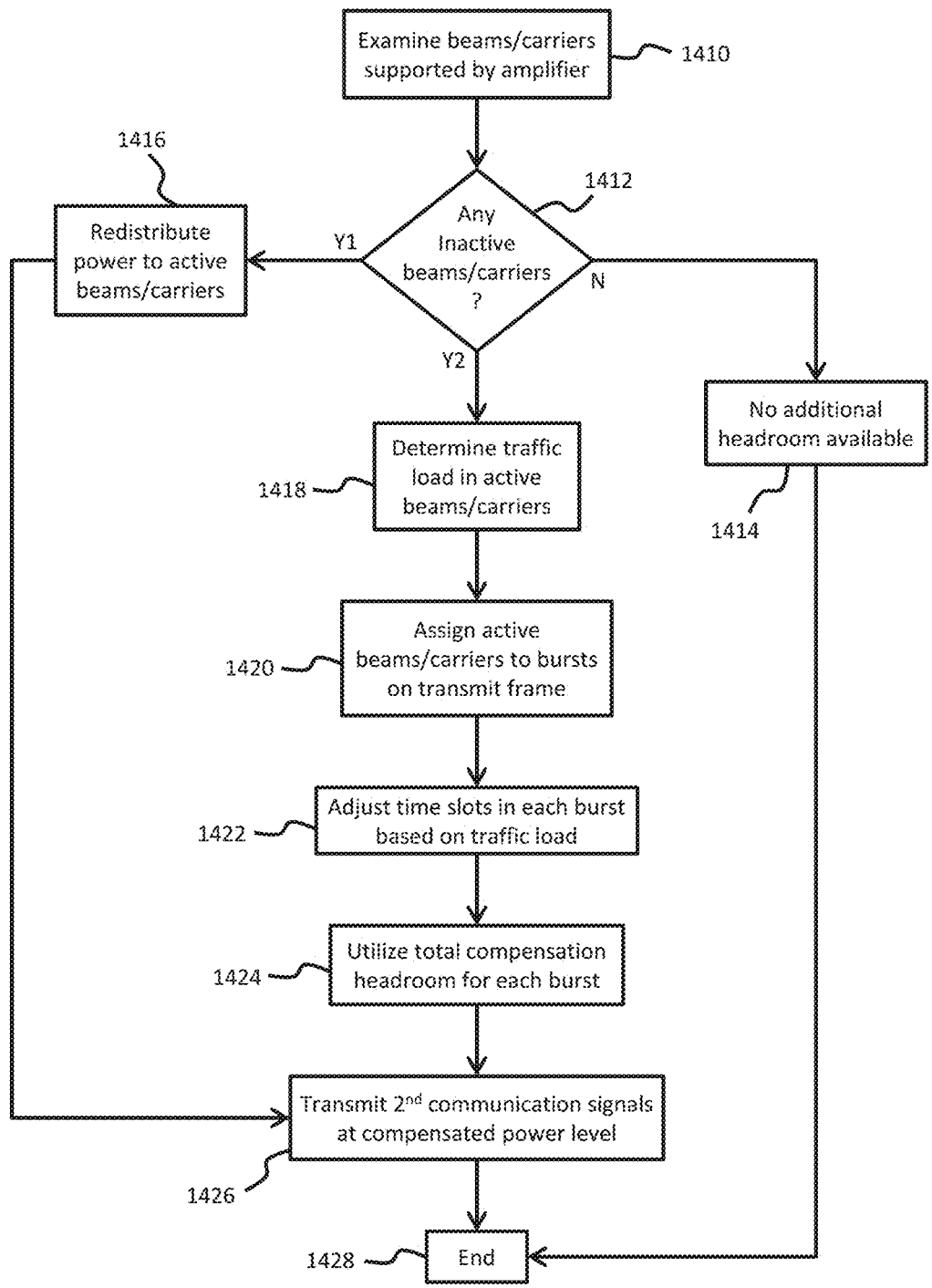
FIG. 14 is a flowchart illustrating steps performed to increase amplifier headroom, according to one or more embodiments.

FIG. 14 is a flowchart illustrating steps performed to increase amplifier headroom, according to one or more embodiments. 1410, the beams/carriers supported by the amplifier are examined. At 1412, it is determined whether any of the beams/carriers are currently inactive, or deactivated. If there are no inactive beans/carriers, control passes to 1414 where it is determined that no additional power headroom is available to the amplifier. The process would then end at 1428.

As previously discussed, it is often necessary to deactivate one or more beams, depending on satellite latitude, in order to avoid self-interference or geo-interference. According to the illustrated embodiment, two options are available if any of the beams/carriers are inactive. According to a first option (Y1), control passes to 1416. Power reserved for the inactive beans or carriers is then redistributed for use with the active beams/carriers. More particularly, the power headroom available to the amplifier remains the same because power reserved for the inactive beams/carrier is not used. The reserved power, therefore, can be redistributed so that the power headroom can be increased for the active beams/carriers. Control subsequently passes to 1426 where the second communication signals are transmitted at the compensated power levels.

According a second option, if any inactive beans/carriers are detected, control passes to 1418. The traffic load within the active beams/carriers is determined. At 1420, the active beams/carriers are assigned to specific bursts on a transmit frame. According to one or more embodiments, the active beams/carriers can be assigned such that simultaneous transmissions are reduced or eliminated. At 1422, the number of time slots in each burst is adjusted based on the traffic load in its assigned beam. As previously discussed, the number of time slots in each burst can correspond to the level of traffic in each beam/carrier. For example, if the traffic load on a first beam/carrier is greater than that of the remaining seven beans/carriers, then additional time slots would be added to the burst assigned carry traffic from the first beam/carrier. At 1424, the total compensation headroom available to the amplifier is utilized for each burst on the transmit frame. At 1426, the 2nd communication signals are transmitted at the compensated power levels. The process subsequently ends at 1428.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described receivers, transmitters, gateway, transmit controller, telemetry receiver, rain fade estimator, etc. Additionally, such hardware can be interfaced to connect and/or facilitate communication between different components such as, for example, the telemetry receiver and rain fade estimator.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), generalpurpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 15:
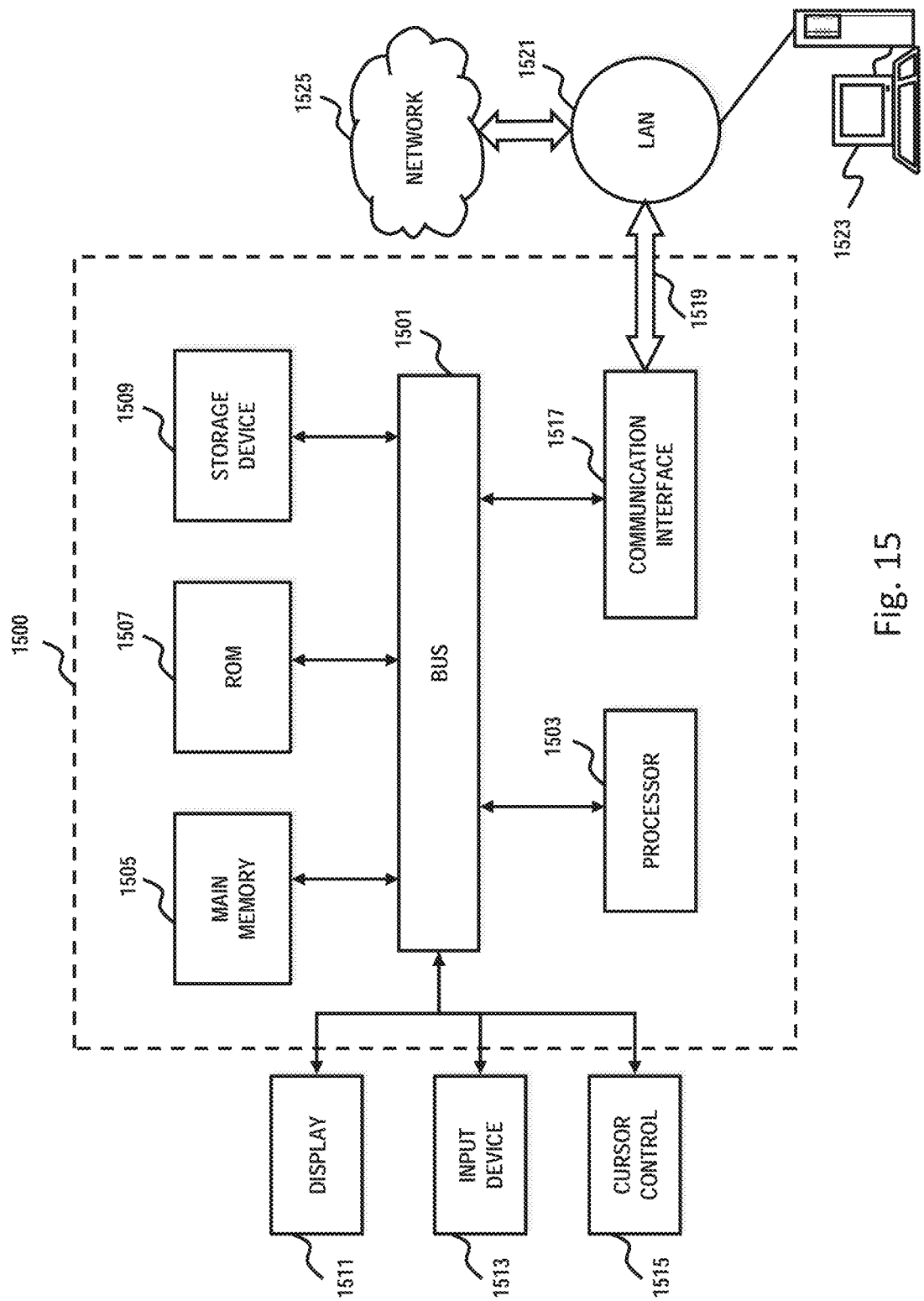
FIG. 15 is a diagram of a computer system that can be used to implement various exemplary embodiments.

FIG. 15 is a diagram of a computer system that can be used to implement features of various embodiments. The computer system 1500 includes a bus 1501 or other communication mechanism for communicating information and a processor 1503 coupled to the bus 1501 for processing information. The computer system 1500 also includes main memory 1505, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1501 for storing information and instructions to be executed by the processor 1503. Main memory 1505 can also be used for storing temporary variables or other intermediate information during execution of instructions by the processor 1503. The computer system 1500 may further include a read only memory (ROM) 1507 or other static storage device coupled to the bus 1501 for storing static information and instructions for the processor 1503. A storage device 1509, such as a magnetic disk or optical disk, is coupled to the bus 1501 for persistently storing information and instructions.

The computer system 1500 may be coupled via the bus 1501 to a display 1511, such as a light emitting diode (LED) or other flat panel displays, for displaying information to a computer user. An input device 1513, such as a keyboard including alphanumeric and other keys, is coupled to the bus 1501 for communicating information and command selections to the processor 1503. Another type of user input device is a cursor control 1515, such as a mouse, a trackball, or cursor direction keys, for communicating direction information and command selections to the processor 1503 and for controlling cursor movement on the display 1511. Additionally, the display 1511 can be touch enabled (i.e., capacitive or resistive) in order facilitate user input via touch or gestures.

According to an exemplary embodiment, the processes described herein are performed by the computer system 1500, in response to the processor 1503 executing an arrangement of instructions contained in main memory 1505. Such instructions can be read into main memory 1505 from another computer-readable medium, such as the storage device 1509. Execution of the arrangement of instructions contained in main memory 1505 causes the processor 1503 to perform the process steps described herein. One or more processors in a multi-processing arrangement may also be employed to execute the instructions contained in main memory 1505. In alternative embodiments, hard-wired circuitry may be used in place of or in combination with software instructions to implement exemplary embodiments. Thus, exemplary embodiments are not limited to any specific combination of hardware circuitry and software.

The computer system 1500 also includes a communication interface 1517 coupled to bus 1501. The communication interface 1517 provides a two-way data communication coupling to a network link 1519 connected to a local network 1521. For example, the communication interface 1517 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1517 sends and receives electrical, electromagnetic, or optical signals that carry digital data streams representing various types of information. Further, the communication interface 1517 can include peripheral interface devices, such as a Universal Serial Bus (USB) interface, a High Definition Multimedia Interface (HDMI), etc. Although a single communication interface 1517 is depicted in FIG. 15, multiple communication interfaces can also be employed.

The network link 1519 typically provides data communication through one or more networks to other data devices. For example, the network link 1519 may provide a connection through local network 1521 to a host computer 1523, which has connectivity to a network 1525 such as a wide area network (WAN) or the Internet. The local network 1521 and the network 1525 both use electrical, electromagnetic, or optical signals to convey information and instructions. The signals through the various networks and the signals on the network link 1519 and through the communication interface 1517, which communicate digital data with the computer system 1500, are exemplary forms of carrier waves bearing the information and instructions.

The computer system 1500 can send messages and receive data, including program code, through the network (s), the network link 1519, and the communication interface 1517. In the Internet example, a server (not shown) might transmit requested code belonging to an application program for implementing an exemplary embodiment through the network 1525, the local network 1521 and the communication interface 1517. The processor 1503 may execute the transmitted code while being received and/or store the code in the storage device 1509, or other non-volatile storage for later execution. In this manner, the computer system 1500 may obtain application code in the form of a carrier wave.

The term "computer-readable medium" as used herein refers to any medium that participates in providing instructions to the processor 1503 for execution. Such a medium may take many forms, including but not limited to non-volatile media, volatile media, and transmission media. Non-volatile media include, for example, optical or magnetic disks, such as the storage device 1509. Non-volatile media can further include flash drives, USB drives, microSD cards, etc. Volatile media include dynamic memory, such as main memory 1505. Transmission media include coaxial cables, copper wire and fiber optics, including the wires that comprise the bus 1501. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

FIG. 16 illustrates a chip set 1600 upon which features of various embodiments may be implemented. Chip set 1600 is programmed to implement various features as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1600, or a portion thereof, constitutes a means for performing one or more steps of the figures.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1605 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    monitoring first communication signals transmitted at a first frequency from a satellite to a satellite operations center, at a gateway of a satellite communication system;
    determining a downlink attenuation level of the first communication signals, the downlink attenuation resulting, at least in part, from atmospheric conditions;
    comparing the downlink attenuation level to an ideal attenuation level;
    if the downlink attenuation level exceeds the ideal attenuation level, then performing an uplink compensation by:
        determining a corresponding uplink attenuation level for a second frequency used to transmit second communication signals containing user traffic to the satellite,
        setting a target uplink power level for reducing and/or cancelling the uplink attenuation level, and
        converting the uplink attenuation level to a power control command for adjusting an amplifier gain, the power control command being based on the target uplink power level;
    transmitting the second communication signals to the satellite at a compensated power level, if the downlink attenuation level exceeds the ideal attenuation level; and
    transmitting the second communication signals to the satellite at a normal power level, if the downlink attenuation level does not exceed the ideal attenuation level.

2. The method of claim 1, wherein the first communication signals are encrypted telemetry tracking and command signals.

3. The method of claim 1, further comprising:
    setting a predetermined delay level;
    performing the uplink compensation if the downlink attenuation level exceeds the ideal attenuation level by the predetermined delay level; and
    transmitting the second communication signals to the satellite at the normal power level if the downlink attenuation level does not exceed the ideal attenuation level by the predetermined delay level.

4. The method of claim 3, wherein the predetermined delay level is based, at least in part, on an end to end forward link signal to noise ratio between the gateway and a user terminal.

5. The method of claim 1, further comprising verifying the compensated power level corresponds to the target uplink power level.

6. The method of claim 5, wherein the verifying comprises:
    measuring the compensated power level;
    increasing a value of the power control command if the compensated power level is lower than the target uplink power level; and
    decreasing a value of the power control command if the compensated power level is greater than the target uplink power level.

7. The method of claim 1, further comprising detecting interference in the first communication signals.

8. The method of claim 7, wherein detecting interference comprises:
    determining a signal to noise ratio and a received signal strength indicator (RSSI) for the first communication signals; and
    continually measuring a composite noise and interference power based, at least in part, on the signal to noise ratio and RSSI of the first communication signals,
    wherein variations in the composite noise and interference power are indicative of interference in the first communication signals.

9. The method of claim 8, wherein the uplink compensation is only performed if the composite noise and interference power is less than a predetermined amount.

10. The method of claim 1, further comprising increasing a compensation headroom of the amplifier.

11. The method of claim 10, wherein the compensation headroom is based, at least in part, on an elevation angle of a transmitter associated with the gateway.

12. The method of claim 10, wherein increasing a compensation headroom comprises dynamically redistributing power allocated to individual beams and/or carriers supported by the amplifier.

13. The method of claim 10, wherein increasing a compensation headroom comprises:
identifying inactive beams and/or carriers supported by the amplifier; and
redistributing power from the amplifier reserved for the inactive beams and/or carriers to active beams and/or carriers.

14. The method of claim 10, wherein increasing a compensation headroom comprises staggering a transmission schedule of beams and/or carriers in the second communication signals to reduce simultaneous transmissions across all beams and/or carriers.

15. The method of claim 14, wherein staggering the transmission schedule comprises:
determining a number of currently active beams and/or carriers supported by the amplifier;
assigning one or more of the active beams and/or carriers to sequential bursts for a transmit frame; and
sequentially utilizing the compensation headroom available to the amplifier for each burst of the transmit frame.

16. The method of claim 15, wherein:
the currently active beams and/or carriers are assigned based, at least in part, on traffic load; and
each burst occupies one or more time slots on the transmit frame.

17. A system comprising:
a satellite; and
a gateway for communicating with the satellite and one or more external networks, the gateway including:
at least one processor for controlling various operations of the gateway;
a transceiver unit for transmitting/receiving signals to/from a satellite;
a telemetry receiver for monitoring first communication signals transmitted from the satellite at a first frequency; and
a rain fade estimation unit configured to:
determine a downlink attenuation level of the first communication signals, the downlink attenuation resulting, at least in part, from atmospheric conditions,
determine if the downlink attenuation level exceeds an ideal attenuation level,
determine a corresponding uplink attenuation level for a second frequency used to transmit second communication signals containing user traffic to the satellite,
set a target uplink power level for reducing and/or cancelling the uplink attenuation level, and
convert the uplink attenuation level to a power control command for adjusting an amplifier gain, the power control command being based on the target uplink power level,
wherein the gateway transmits the second communication signals to the satellite at a compensated power level, and
wherein the gateway transmits the second communication signals to the satellite at a normal power level if the downlink attenuation level does not exceed the ideal attenuation level.

18. The system of claim 17, wherein the first communication signals are encrypted telemetry tracking and command signals.

19. The system of claim 17, wherein:
the rain fade estimation unit is further configured to convert the uplink attenuation level only if the downlink attenuation level exceeds the ideal attenuation level by a predetermined delay level; and
the gateway transmits the second communication signals to the satellite at the normal power level if the downlink attenuation level does not exceed the ideal attenuation level by the predetermined delay level.

20. The system of claim 19, wherein the predetermined delay level is based, at least in part, on an end to end forward link signal to noise ratio between the gateway and a user terminal.

21. The system of claim 17, further comprising:
a power sensor for measuring the compensated power level,
wherein the at least one processor is further configured to increase a value of the power control command if the compensated power level is lower than the target uplink power level, and decrease a value of the power control command if the compensated power level is greater than the target uplink power level.

22. The system of claim 17, wherein the telemetry receiver is configured to:
determine a signal to noise ratio and a received signal strength indicator (RSSI) for the first communication signals;
continually measure a composite noise and interference power based, at least in part, on the signal to noise ratio and RSSI of the first communication signals; and
identify interference in the first communication signals if variations are detected in the composite noise and interference power.

23. The system of claim 22, wherein the rain fade estimation unit is further configured to convert the uplink attenuation level only if the composite noise and interference power is less than a predetermined amount.

24. The system of claim 17, wherein the at least one processor is further configured to increase a compensation headroom of the amplifier.

25. The system of claim 24, wherein the compensation headroom is based, at least in part, on an elevation angle of a transmitter associated with the gateway.

26. The system of claim 24, wherein the compensation headroom is increased by dynamically redistributing power allocated to individual beams and/or carriers supported by the amplifier.

27. The system of claim 24, wherein the at least one processor is configured to increase the compensation headroom by:
identifying inactive beams and/or carriers supported by the amplifier; and
redistributing power from the amplifier reserved for the inactive beams and/or carriers to active beams and/or carriers.

28. The system of claim 24, the at least one processor is configured to increase the compensation headroom by staggering a transmission schedule of beams and/or carriers in the second communication signals to reduce simultaneous transmissions across all beams and/or carriers.

29. The system of claim 28, wherein the at least one processor is further configured to stagger the transmission schedule by:
- determining a number of currently active beams and/or carriers supported by the amplifier;
- assigning one or more of the active beams and/or carriers to sequential bursts for a transmit frame; and
- sequentially utilizing the compensation headroom available to the amplifier for each burst of the transmit frame.

30. The system of claim 28, wherein:
- the currently active beams and/or carriers are assigned based, at least in part, on traffic load; and
- each burst occupies one or more time slots on a transmit frame.

* * * * *